US008104366B2

(12) United States Patent  (10) Patent No.: US 8,104,366 B2
Remmler et al.  (45) Date of Patent: Jan. 31, 2012

(54) DOUBLE-CLUTCH TRANSMISSION FOR VEHICLES

(75) Inventors: Mathias Remmler, Mauchenheim (DE); Markus Rockenbach, Schweppenhausen (DE); Axel Geiberger, Mainz (DE); Mikael Mohlin, Kungälv (SE)

(73) Assignee: GM Global Technology Operations LLC, Detroit, MI (US)

( * ) Notice: Subject to any disclaimer, the term of this patent is extended or adjusted under 35 U.S.C. 154(b) by 480 days.

(21) Appl. No.: 12/415,787

(22) Filed: Mar. 31, 2009

(65) Prior Publication Data

US 2009/0255370 A1  Oct. 15, 2009

(30) Foreign Application Priority Data

| Mar. 31, 2008 | (EP) | 08006486 |
| Mar. 31, 2008 | (EP) | 08006569 |
| Mar. 31, 2008 | (EP) | 08006606 |
| Mar. 31, 2008 | (EP) | 08006607 |
| Mar. 31, 2008 | (EP) | 08006608 |
| Mar. 31, 2008 | (EP) | 08006609 |
| Mar. 31, 2008 | (EP) | 08006610 |
| Mar. 31, 2008 | (EP) | 08006611 |
| Mar. 31, 2008 | (EP) | 08006612 |
| Mar. 31, 2008 | (EP) | 08006613 |
| Mar. 31, 2008 | (EP) | 08006614 |
| Mar. 31, 2008 | (EP) | 08006615 |
| Mar. 31, 2008 | (EP) | 08006616 |
| Mar. 31, 2008 | (EP) | 08006617 |
| Mar. 31, 2008 | (EP) | 08006618 |
| Mar. 31, 2008 | (EP) | 08006619 |
| Mar. 31, 2008 | (EP) | 08006620 |
| Mar. 31, 2008 | (EP) | 08006621 |
| Mar. 31, 2008 | (EP) | 08006622 |
| Mar. 31, 2008 | (EP) | 08006623 |
| Mar. 31, 2008 | (EP) | 08006624 |
| Mar. 31, 2008 | (EP) | 08006625 |
| Mar. 31, 2008 | (EP) | 08006626 |
| Mar. 31, 2008 | (EP) | 08006627 |
| Mar. 31, 2008 | (EP) | 08006628 |
| Mar. 31, 2008 | (EP) | 08006629 |
| Mar. 31, 2008 | (EP) | 08006630 |
| Mar. 31, 2008 | (EP) | 08006631 |
| Mar. 31, 2008 | (EP) | 08006632 |
| Mar. 31, 2008 | (EP) | 08006633 |
| Mar. 31, 2008 | (EP) | 08006634 |
| Mar. 31, 2008 | (EP) | 08006635 |
| Mar. 31, 2008 | (EP) | 08006636 |
| Mar. 31, 2008 | (EP) | 08006637 |
| Mar. 31, 2008 | (EP) | 08006638 |
| Mar. 31, 2008 | (EP) | 08006639 |
| Mar. 31, 2008 | (EP) | 08006640 |
| Mar. 31, 2008 | (EP) | 08006641 |
| Mar. 31, 2008 | (EP) | 08006642 |
| Mar. 31, 2008 | (EP) | 08006643 |
| Mar. 31, 2008 | (EP) | 08006644 |
| Mar. 31, 2008 | (EP) | 08006645 |
| Mar. 31, 2008 | (EP) | 08006646 |
| Mar. 31, 2008 | (EP) | 08006647 |
| Mar. 31, 2008 | (EP) | 08006648 |
| Mar. 31, 2008 | (EP) | 08006649 |

(51) Int. Cl.
*F16H 3/08* (2006.01)
(52) U.S. Cl. .................................... 74/330; 74/331
(58) Field of Classification Search ............... None
See application file for complete search history.

(56) References Cited

U.S. PATENT DOCUMENTS

| 6,634,247 | B2 | 10/2003 | Pels et al. | |
| 7,044,014 | B2 * | 5/2006 | Janson et al. | 74/331 |
| 7,383,749 | B2 * | 6/2008 | Schafer et al. | 74/340 |
| 7,395,735 | B2 * | 7/2008 | Enstrom et al. | 74/661 |
| 7,621,195 | B2 * | 11/2009 | Hattori | 74/331 |
| 2009/0266191 | A1 * | 10/2009 | Remmler | 74/331 |

FOREIGN PATENT DOCUMENTS

| EP | 1077336 A1 | 2/2001 |
| EP | 1714816 A1 | 10/2006 |

OTHER PUBLICATIONS

German Patent Office, German Search Report for German Application No. 102009014938.4, Jul. 29, 2010.
Naunheimer, Harald, Bertsche, Bernd, Vehicle Transmissions, 2nd Revised and Enlarged Edition, Springer-Verlag, Berlin, Heidelberg 2007, pp. 368-373.

\* cited by examiner

*Primary Examiner* — Dirk Wright
(74) *Attorney, Agent, or Firm* — Ingrassia Fisher & Lorenz, P.C.

(57) ABSTRACT

A double-clutch transmission is provided that includes, but is not limited to an inner input shaft inside an outer input shaft. Two clutch discs are connected to the inner input shaft and the outer input shaft, respectively. A first layshaft and a second layshaft are spaced apart from the inner input shaft and arranged in parallel to the inner input shaft. One or more of the two layshafts comprise a fixed output gearwheel for outputting a drive torque. Gearwheels are arranged on the shafts. The gearwheels comprise six gearwheel groups for providing six forward gears and one reverse gear. Each of the gearwheel groups comprises a first fixed gearwheel on one of the inner input shaft meshing with one of the idler gearwheels on one of the first layshaft, the second layshaft, or the third layshaft. Furthermore, a second fixed gearwheel meshes with a second gear idler gearwheel and a fourth gear idler gearwheel. The double-clutch transmission device further comprises a seventh gearwheel group for providing a seventh gear. The seventh gearwheel group comprises a seventh fixed gearwheel on the outer input shaft, meshing with a seventh gear idler gearwheel on one of the first layshaft, the second layshaft, or the third layshaft.

13 Claims, 12 Drawing Sheets

(2nd gear)

(3rd gear)

(4th gear)

(5th gear)

(6th gear)

(7th gear)

(1st Reverse gear)

DOUBLE-CLUTCH TRANSMISSION FOR VEHICLES

CROSS-REFERENCE TO RELATED APPLICATION

This application claims priority to European Patent Application No. 08006645.9, filed Mar. 31, 2008, claims priority to European Patent Application No. 08006638.4, filed Mar. 31, 2008, claims priority to European Patent Application No. 08006639.2, filed Mar. 31, 2008, claims priority to European Patent Application No. 08006640.0, filed Mar. 31, 2008, claims priority to European Patent Application No. 08006641.8, filed Mar. 31, 2008, claims priority to European Patent Application No. 08006642.6, filed Mar. 31, 2008, claims priority to European Patent Application No. 08006635.0, filed Mar. 31, 2008, claims priority to European Patent Application No. 08006643.4, filed Mar. 31, 2008, claims priority to European Patent Application No. 08006644.2, filed Mar. 31, 2008, claims priority to European Patent Application No. 08006486.8, filed Mar. 31, 2008, claims priority to European Patent Application No. 08006606.1, filed Mar. 31, 2008, claims priority to European Patent Application No. 08006607.9, filed Mar. 31, 2008, claims priority to European Patent Application No. 08006608.7, filed Mar. 31, 2008, claims priority to European Patent Application No. 08006646.7, filed Mar. 31, 2008, claims priority to European Patent Application No. 08006616.7, filed Mar. 31, 2008, claims priority to European Patent Application No. 08006617.8, filed Mar. 31, 2008, claims priority to European Patent Application No. 08006609.5, filed Mar. 31, 2008, claims priority to European Patent Application No. 08006610.3, filed Mar. 31, 2008, claims priority to European Patent Application No. 08006611.1, filed Mar. 31, 2008, claims priority to European Patent Application No. 08006612.9, filed Mar. 31, 2008, claims priority to European Patent Application No. 08006621.0, filed Mar. 31, 2008, claims priority to European Patent Application No. 08006622.8, filed Mar. 31, 2008, claims priority to European Patent Application No. 08006623.6, filed Mar. 31, 2008, claims priority to European Patent Application No. 08006624.4, filed Mar. 31, 2008, claims priority to European Patent Application No. 08006569.1, filed Mar. 31, 2008, claims priority to European Patent Application No. 08006637.6, filed Mar. 31, 2008, claims priority to European Patent Application No. 08006615.2, filed Mar. 31, 2008, claims priority to European Patent Application No. 08006636.8, filed Mar. 31, 2008, claims priority to European Patent Application No. 08006625.1, filed Mar. 31, 2008, claims priority to European Patent Application No. 08006626.9, filed Mar. 31, 2008, claims priority to European Patent Application No. 08006627.7, filed Mar. 31, 2008, claims priority to European Patent Application No. 08006628.5, filed Mar. 31, 2008, claims priority to European Patent Application No. 08006629.3, filed Mar. 31, 2008, claims priority to European Patent Application No. 08006630.1, filed Mar. 31, 2008, claims priority to European Patent Application No. 08006631.9, filed Mar. 31, 2008, claims priority to European Patent Application No. 08006619.4, filed Mar. 31, 2008, claims priority to European Patent Application No. 08006620.2, filed Mar. 31, 2008, claims priority to European Patent Application No. 08006618.6, filed Mar. 31, 2008, claims priority to European Patent Application No. 08006614.5, filed Mar. 31, 2008, claims priority to European Patent Application No. 08006613.7, filed Mar. 31, 2008, claims priority to European Patent Application No. 08006634.3, filed Mar. 31, 2008, claims priority to European Patent Application No. 08006633.5, filed Mar. 31, 2008, claims priority to European Patent Application No. 08006632.7, filed Mar. 31, 2008, claims priority to European Patent Application No. 08006649.1, filed Mar. 31, 2008, claims priority to European Patent Application No. 08006648.3, filed Mar. 31, 2008, claims priority to European Patent Application No. 08006647.5, filed Mar. 31, 2008, which are incorporated herein by reference in their entirety.

TECHNICAL FIELD

The present application relates to a double-clutch transmission for vehicles, such as cars.

BACKGROUND

A double-clutch transmission (DCT) comprises two input shafts that are connected to and that are actuated by two clutches separately. The two clutches are often combined into a single device that permits actuating any of the two clutches at a time. The two clutches are connected to two input shafts of the DCT separately for providing driving torques.

U.S. Pat. No. 6,634,247 B2 presents several proposals of DCT for vehicles. However, DCT has not yet been widely used in cars for street driving. Problems that hinder the application of DCT for street driving comprise provision of a compact, reliable, and fuel-efficient DCT. Therefore, there exists a need for providing such a DCT that is also affordable by consumers. In addition, other needs, desirable features and characteristics will become apparent from the subsequent summary and detailed description, and the appended claims, taken in conjunction with the accompanying drawings and this background.

SUMMARY

The present application provides a double-clutch transmission that comprises an inner input shaft and an outer input shaft. The inner input shaft can have a hollow or solid interior. The outer input shaft radially encloses a portion of the inner input shaft. The radial direction indicates surrounding regions around a longitudinal axis of the inner input shaft.

The DCT comprises a first clutch disc that is non-rotatably connected to the inner input shaft and a second clutch disc that is also non-rotatably connected to the outer input shaft. In other words, the first clutch disc is fixed to the inner input shaft and the second clutch disc is fixed to the outer input shaft. In certain cases, a universal joint provides the non-rotatable connection.

The DCT comprises a first layshaft, a second layshaft, and a third shaft that are radially spaced apart from the input shafts and that are arranged in parallel to the input shafts. One or more of the layshafts comprise a pinion or pinions for outputting a drive torque. The DCT is part of a torque drain. The torque drain is also known as a drive train, a power train, or a power plant that refers to a group of components for generating power and for delivering it to the road surface, water, or air. This includes an engine, a transmission, drive shafts, differentials, and a final drive, such as drive wheels, continuous track that is used by tanks, tractors, or propeller. Sometimes the torque train is used to refer to simply the engine and transmission, and including other components only if they are integral to the transmission.

Gearwheels of the DCT are arranged on the first layshaft, on the second layshaft, on the third layshaft, on the inner input shaft and on the outer input shaft. The gearwheels comprise a first gearwheel group, a second gearwheel group, a third gearwheel group, a fourth gearwheel group, a fifth gearwheel group, a sixth gearwheel group, a seventh gearwheel group, and a reverse gearwheel group for providing seven sequentially increasing forward gears and one reverse gear respectively.

The sequentially increasing gears describe an escalating order where members of the order follow each other. Gears of a car are arranged typically in a sequentially increasing manner from first gear to sixth gear. For example, a vehicle can have a transmission with a first gear ratio of about 2.97:1; a second gear ratio of about 2.07:1; a third gear ratio of about 1.43:1; a fourth gear ratio of about 1.00:1; a fifth gear ratio of about 0.84:1; a sixth gear ratio of about 0.56:1; and a seventh gear ratio of about 0.38:1. The seven gear ratios provide an increasing order of output speed of the transmission for driving the vehicle.

The first gearwheel group comprises a first fixed gearwheel on the outer input shaft, meshing directly or indirectly with a first gear idler gearwheel on one of the layshafts. The direct meshing can be provided by the first fixed gearwheel that is in physical contact and that is in engagement with another gearwheel on one of the layshafts. The indirect meshing can be provided by the first fixed gearwheel that meshes with first gear idler gearwheel via one or more intermediate gearwheels.

In a similar manner, the third gearwheel group comprises a third fixed gearwheel on the outer input shaft, meshing with a third gear idler gearwheel on one of the layshafts. The fifth gearwheel group comprises a fifth fixed gearwheel on the outer input shaft, meshing with a fifth gear idler gearwheel on one of the layshafts. The seventh gearwheel group comprises a seventh fixed gearwheel on the outer input shaft, meshing with a seventh gear idler gearwheel on one of the layshafts. The second gearwheel group comprises a second fixed gearwheel on the inner input shaft, meshing with a second gear idler gearwheel on one of the layshafts. The fourth gearwheel group comprises a fourth fixed gearwheel on the inner input shaft, meshing with a fourth gear idler gearwheel on one of the layshafts. The sixth gearwheel group comprises a sixth fixed gearwheel on the inner input shaft, meshing with a sixth gear idler gearwheel on one of the layshafts. The reverse gearwheel group comprises a fixed driving gearwheel on one of the input shafts, meshing with a reverse gear idler gearwheel on one of the layshafts. Each one of gearwheel groups comprises a coupling device, which is arranged on one of the layshafts to selectively engage one of the idler gearwheels for providing one of the gears.

Furthermore, the second fixed gearwheel meshes with the second gear idler gearwheel and with the fourth gear idler gearwheel. In addition, the double-clutch transmission includes a park-lock that is provided on one of the layshaft. The park-lock keeps a vehicle with the double-clutch transmission from moving, even when the vehicle is on a slope, when the vehicle is in a park position. This is beneficial for the vehicle and passengers in the vehicle.

The DCT provides seven forward gears and one reverse gear through the dual clutches. The DCT enables gear switching between odd and even gears in a swift and efficient manner because the gearwheels of the odd gears and the gearwheels of even gears are driven by different clutches respectively. One double meshing feature is provided by the second fixed gearwheel that meshes with the second gear idler gearwheel and with the fourth gear idler gearwheel. The double meshing feature makes the double-clutch transmission compact and lightweight with low cost because one fixed gearwheel is avoided on one of the input shafts.

According to the application, the first forward gear and the reverse gear can be provided on different input shafts for moving the vehicle out of a muddy puddle. Once the first forward gear and the reverse gear are provided on two different input shafts, the two clutches of the DCT can provide efficient switching between the two input shafts. As a result, a driving scheme that the DCT engages one of the two input shafts alternatively can drive the vehicle back and forth rapidly without much loss in momentum. Put differently, the vehicle can be driven out of a muddy puddle because the vehicle can simply be driven back and forth for getting the vehicle out of the puddle without a time consuming switching of the gears of the transmission.

For easy implementation of the park-lock, the park-lock can be provided on the layshaft that comprises the pinion, which acts as a final drive.

According to the application, two gearwheels of the DCT on the third layshaft can mesh with two other gearwheels on the first layshaft. The two gearwheels on the third layshaft allow torque that is received from the first layshaft can be transmitted back to the first layshaft. A pinion on the third layshaft for outputting torque of the third layshaft to an output gearwheel is thus avoided. Weight and cost of the DCT is then reduced.

In the application, a distance between the first layshaft and the inner input shaft is greater than a distance between the second layshaft and the inner input shaft. Since gearwheels on the first layshaft of low gears are usually larger than the gearwheels of high gears, the second layshaft can be brought closer to the input shafts so that the DCT can be made more compact.

Further, two or more of the fourth gear idler gearwheel, the fifth gear idler gearwheel, the sixth gear idler gearwheel, and the seventh gear idler gearwheel can be mounted on the same layshaft. Gearwheels of higher gears can be installed advantageously on the same shaft and thus allowing the shaft to be slim for reduction of cost and of size of the double-clutch transmission. For example, the fourth gear idler gearwheel, the fifth gear idler gearwheel, the sixth gear idler gearwheel, and the seventh gear idler gearwheel can be mounted on the second layshaft.

In addition, two or more of the first gear idler gearwheel, the second gear idler gearwheel, and the third gear idler gearwheel can be mounted on the same layshaft.

In certain cases, the first gear idler gearwheel, the second gear idler gearwheel, and the third gear idler gearwheel are mounted on the first layshaft. It is of advantage that gearwheels of low gears, such as the first, second, or third gear, are installed on the same shaft and thus relieves other shaft of heavy loads. The low gear shaft can be made thick and the other layshaft can be made slim for lower cost.

According to the application, the DCT can also comprise bearings for supporting the three layshafts. One or more of the bearings can be provided adjacent one of the first gear idler gearwheel, the third gear idler gearwheel, and the second gear idler gearwheel of low gears. This arrangement allows the supporting shaft to have less bending or deflection. Consequently, the support shaft can thinner for lower cost.

The double clutch transmission enables pre-selection of gears for smooth gear transmission. Two coupling devices can engage the idler gearwheel of the current gear and the idler gearwheel of the next sequential gear at the same time. This allows the next sequential gear to be connected rapidly and thus in a more smooth manner.

In particular, the two idlers of two consecutive gears that are driven by different input shafts of the DCT can be both engaged simultaneously. For example, idler gearwheels of the third gear and the fourth gear of the DCT can be both engaged to their weight-carrying layshafts by their respectively coupling devices when one of the input shafts receives an input torque. In this manner, little or no interruption exists in torque flow during gearshift. Therefore, the double-clutch transmission provides continuous and more efficient torque transmission, as compared to other gearshift process.

The application provides a gearbox with the double-clutch transmission that comprise an output gearwheel, which meshes with an upper pinion on the first layshaft, a lower pinion on the second layshaft, and a reverse pinion on the third layshaft for outputting torques of these layshafts. The output gearwheel receives driving torques from the pinions and provides a single output to an exterior of the double-clutch transmission. No multiple external connections that are associated to the layshafts are required. Connection to the double-clutch transmission is thus made simple.

The application provides a power train device with the gearbox. The power train device includes one or more power sources for generating a driving torque. The power source can be onboard with the power train so that the vehicle becomes mobile for carrying goods or passengers.

The power source can comprise a combustion engine. The vehicle having the combustion engine and the double-clutch transmission is easy to manufacture. The combustion engine can consume less petrol for environmental protection. Furthermore, a combustion engine for other types of fuel can have even less polluting emission, such as hydrogen fuel.

Alternatively, the power source can comprise an electric motor is provided. Electric motor used in a hybrid car, or in an electrical car enables reduction of pollution, as compared to typical combustion using petrol. The electric motor can even recuperate brake energy in a generator mode.

The application provides a vehicle that comprises the power train device. The vehicle having the power train device is efficient in energy usage due to the double-clutch transmission.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the application and uses. Furthermore, there is no intention to be bound by any theory presented in the preceding background or summary or the following detailed description.

In the following description, details are provided to describe the embodiments of the application. It shall be apparent to one skilled in the art, however, that the embodiments may be practiced without such details.

FIGS. 1 to 15 provide detailed description of an embodiment of a double clutch transmission (DCT) of the application. FIGS. 1 to 15 have similar parts. The similar parts have same name or same reference number. The description of the similar part is thus incorporated by reference.

Figure 1:
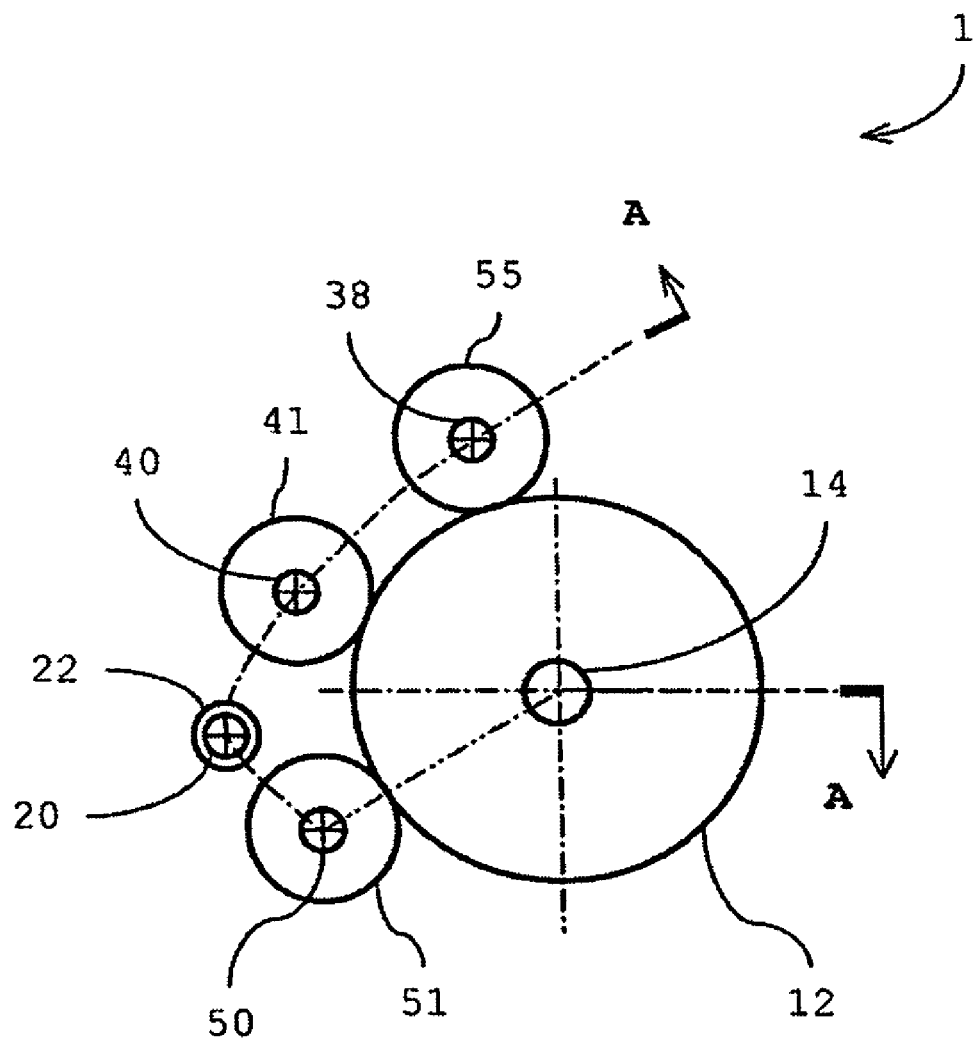
FIG. 1 illustrates a front view of an embodiment of a double clutch transmission of the application.

FIG. 1 illustrates a front view of an embodiment of a double clutch transmission 1 of the application. The DCT 1 comprises a relatively large output gearwheel 12, two input shafts 20, 22 and three pinions 41, 51, 55. The two input shafts 20, 22 are a solid input shaft 20 and a hollow input shaft 22. The solid input shaft 20 is also called K1 and the hollow input shaft 22 is called K2. The solid input shaft 20 and the hollow input shaft 22 share the same rotational axis and are non-rotatably connected to two clutches 8, 10 of a double-clutch 6, separately. The three pinions are the upper pinion 41, the lower pinion 51 and the reverse pinion 55. The three pinions are fixed to an upper layshaft 40, a lower layshaft 50, and a reverse gear layshaft 38 at their rotational axes respectively. The output gearwheel 12 is fixed to an output shaft 14 at its rotation axis. The three pinions mesh with the output gearwheel 12 at different positions of the output gearwheel 12 separately.

The input shafts 20, 22, the upper layshaft 40, the lower layshaft 50, and the reverse gear layshaft 38 are parallel to each other at predetermined distances. The distances are provided in radial directions of these shafts 20, 22, 40, 50, 38, which are better seen in FIG. 2. Other gearwheels are mounted on these shafts 20, 22, 38, 40, 50 respectively that mesh with each other according to predetermined manners. The manners of these gearwheels' mounting and meshing are better seen in some of the following figures.

FIG. 1 further shows a cutting plane A-A for illustrating an expanded cross-section view through the DCT 1, which is shown in FIGS. 2 to 10. The cutting plane A-A passes through the rotation axes of the output gearwheel 12, the lower pinion 51, the input shafts 20, 22, the upper pinion 41 and the reverse pinion 55. One of the goals of FIGS. 2 to 10 is to illustrate further structure and torque flows of the DCT 1.

Figure 2:
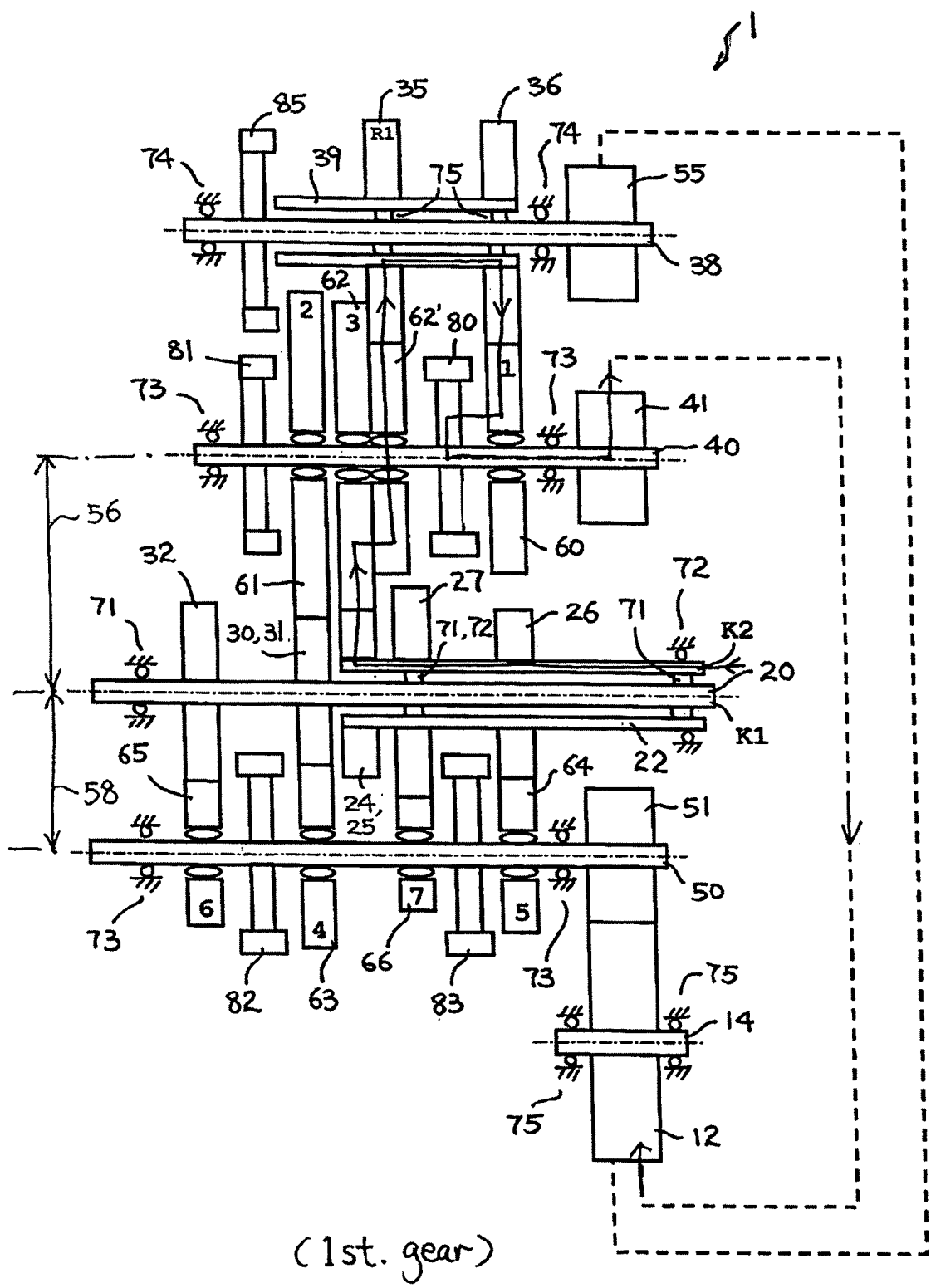
FIG. 2 illustrates the path of torque flow of a first gear transmission ratio.

FIG. 2 illustrates the expanded view of the DCT that shows the manners of the gearwheels mounting, which corresponds to FIG. 1.

According to FIG. 2, the DCT 1 comprises the following shafts, from top to bottom, a reverse gear hollow shaft 39, the reverse gear layshaft 38, the upper layshaft 40, the hollow input shaft 22, the solid input shaft 20, the lower layshaft 50 and the output shaft 14. The reverse gear hollow shaft 39 is mounted on the reverse gear layshaft 38 coaxially by a pair of reverse gear idler shaft bearing 75. The reverse gear hollow shaft 39 is free to rotate around the reverse gear layshaft 38. A pair of idler shaft bearing 75 further supports the reverse gear layshaft 38 at its two ends. In a similar manner, another pair of layshaft bearing 73 supports the upper layshaft 40 at its two ends. The solid input shaft 20 is partially disposed inside the hollow input shaft 22, while the solid input shaft 20 protrudes outside the hollow input shaft 22 at its two ends. The hollow input shaft 22 is mounted onto the solid input shaft 20 by a pair of solid shaft bearings 71 that are disposed between the solid input shaft 20 and the hollow input shaft 22 at two ends of the hollow input shaft 22. As a result, the two input shafts 20, 22 are coupled such that the solid input shaft 20 is free to rotate inside the hollow input shaft 22. The hollow input shaft 22 surrounds a right portion of the solid input shaft 20, while a left portion of the solid input shaft 20 is exposed outside the hollow input shaft 22. The assembly of the input shafts 20, 22 is supported by a solid shaft bearing 71 at a protruding end of the solid shaft 20 on the left and by a hollow shaft bearing 72 on the right on the hollow input shaft 22.

As shown in FIG. 2, a portion of the solid input shaft 20 is surrounded by the outer input shaft 22 in a radial direction of the input shafts 20, 22. Two gearwheels are mounted on the left exposed portion of the solid input shaft 20. These two gearwheels are a fixed wheel sixth gear 32 and a fixed wheel second gear 30. The fixed wheel sixth gear 32 and the fixed wheel second gear 30 are disposed, from left to right sequentially, on the exposed portion of the solid shaft 20. The fixed wheel second gear 30 also serves as a fixed wheel fourth gear 31.

On the hollow input shaft 22, which is mounted on the right portion of the solid input shaft 20, there are mounted with a fixed wheel third gear 25, a fixed wheel seventh gear 27, and a fixed wheel fifth gear 26. The fixed wheel third gear 25, the fixed wheel seventh gear 27, and the fixed wheel fifth gear 26 are fixed to the hollow input shaft 22 coaxially.

The lower layshaft 50 is provided below the solid input shaft 20 and the hollow input shaft 22. There are a number of gearwheels and coupling devices mounted on the lower layshaft 50, which include, from right to the left, the lower pinion 51, an idler fifth gear 64, a double-sided coupling device 83, an idler seventh gear 66, an idler fourth gear 63, a double-sided coupling device 82 and an idler sixth gear 65. One layshaft bearing 73 is provided next to both the lower pinion 51 and the idler fifth gear 64. The other layshaft bearing 73 is provided next to the idler sixth gear 65 at the left end of the lower layshaft 50. The lower pinion 51 is fixed to the lower layshaft 50 at its rotational axis. The idler fifth gear 64, the idler seventh gear 66, the idler fourth gear 63 and the idler sixth gear 65 are mounted on the lower layshaft 50 by bearings separately such that these gearwheels are idlers, being free to rotate around the lower layshaft 50. Both the double-sided coupling device 83 and the double-sided coupling device 82 are configured to move along the lower layshaft 50 such that they can either engage a gearwheel on their left or right to the lower layshaft 50 respectively. The idler fifth gear 64 meshes with the fixed wheel fifth gear 26. The idler seventh gear 66 meshes with the fixed wheel seventh gear 27. The idler fourth gear 63 meshes with the fixed wheel fourth gear 31. The idler sixth gear 65 meshes with the fixed wheel sixth gear 32.

The upper layshaft 40 is provided above the input shafts 20, 22. There is provided gearwheels and coupling devices on the upper layshaft 40, which includes, from right to the left, the upper pinion 41, an idler first gear 60, a double-sided coupling device 80, an attached idler third gear 62', an idler third gear 62, an idler second gear 61 and a single-sided coupling device 81. The attached idler third gear 62' and the idler third gear 62 are integral to each other that they share the same rotation axis and are attached to each other in the direction of rotation axis. One layshaft bearing 73 is positioned between the upper pinion 41 and the idler first gear 60. Another layshaft bearing 73 is positioned at opposite end of the upper layshaft 40, next to the single-sided coupling device 81. In other words, gearwheels of low gears 60, 61, 62 are provided on the same layshaft 40, while the two layshafts' bearings 73 are adjacent to the gearwheels of low gears 60, 61. The idler first gear 60, the attached idler third gear 62', the idler third gear 62 and the idler second gear 61 are mounted on the upper layshaft 40 by bearings respectively such that these gearwheels 60, 62', 62, 61 are free to rotate around the upper layshaft 40. The double-sided coupling device 80 is configured to move along the upper layshaft 40 to engage or disengage any of the idler first gear 60 and the idler third gear 62 to the upper layshaft 40. The single-sided coupling device 81 is configured to move along the upper layshaft 40 to engage or disengage the idler second gear 61 to the upper layshaft 40. The idler third gear 62 meshes with the fixed wheel third gear 25, while the idler second gear 61 meshes with the fixed wheel second gear 30.

In other words, there is only one double-meshing feature provided in the DCT 1. The double-meshing feature comprises the fixed wheel second gear 30 meshes with the idler second gear 61 and the idler fourth gear 63. A distance 56 between the input shafts 20, 22 and the upper layshaft 40 is greater than a distance 58 between the input shafts 20, 22 and the lower layshaft 50. The distance 56 between the input shafts 20, 22 and the upper layshaft 40 is measured from a common longitudinal axis of the input shafts 20, 22 to a longitudinal axis of the upper layshaft 40. Similarly, the distance 58 between the input shafts 20, 22 and the lower layshafts 50 is measured from the common longitudinal axis of the input shafts 20, 22 to a longitudinal axis of the lower layshaft 50. This is because the gearwheels 60, 61, 62, 62' on the upper layshaft 40 is larger than the gearwheels 63, 64, 65, 66 on the lower layshaft 50 so that the upper layshaft 40 is made further away to the input shafts 20, 22 than the lower layshaft 50.

The reverse gear layshaft 38 is provided further above the upper layshaft 40. There is provided gearwheels, coupling devices and hollow shaft on the reverse gear layshaft 38, which includes, from right to the left, the reverse pinion 55, a reverse gear hollow shaft 39, a pinion drive gear wheel 36, a first reverse gear wheel 35 and a single-sided coupling device 85.

The first reverse gearwheel 35 and the pinion drive gear wheel 36 are mounted together on a common sleeve, namely a reverse gear hollow shaft 39. The reverse gear hollow shaft 39 is installed on the reverse gear layshaft 38 by a pair of reverse gear idler shaft bearing 75 at its two ends. The pinion drive gear wheel 36 and the first reverse gear wheel 35 are fixed onto the reverse gear hollow shaft 39 from right to left. Both the first reverse gearwheel 35 and the pinion drive gear wheel 36 are fixed onto the 39 that they together are free to rotate around the reverse gear layshaft 38. An idler shaft bearing 74 is provided between the reverse pinion 55 and the reverse gear hollow shaft 39. The single-sided coupling device 85 is configured to move along the reverse gear layshaft 38 to engage or disengage the reverse gear hollow shaft 39 to the reverse gear layshaft 38. The first reverse gearwheel 35 meshes with the attached idler third gear 62', while the pinion drive gear wheel 36 meshes with the idler first gear 60.

The output shaft 14 is provided below the lower layshaft 50. A pair of output shaft bearings 75 is provided at two opposite ends of the output shaft 14 for supporting. The output gearwheel 12 is mounted on the output shaft 14 coaxially. The output gearwheel 12 is also fixed on the output shaft 14 and meshes with the lower pinion 51, the upper pinion 41 and the reverse pinion 55 separately.

In the present specification, the expressions "mesh" and "comb" with respect to geared wheels or engaged gearwheels are provided as synonyms. The solid input shaft 20 is alternatively termed as an inner input shaft 20, while the hollow input shaft 22 is alternatively termed as an outer input shaft 22. A hollow shaft that is disposed inside the hollow input shaft 22 can alternatively replace the solid input shaft 20. The term "coupling device" is alternatively termed as "shifting mechanism" for engaging or disengaging adjacent gearwheels on a shaft. The double-clutch transmission (DCT) is alternatively termed as double clutch, or dual clutch transmission.

The fixed wheel first gear 24 is also known as a first fixed gearwheel. Similarly, the fixed wheel third gear 25 is also known as a third fixed gearwheel. The fixed wheel fifth gear 26 is also known as a fifth fixed gearwheel. The fixed wheel seventh gear 27 is also known as a seventh fixed gearwheel. The fixed wheel second gear 30 is also known a second fixed gearwheel. The fixed wheel fourth gear 31 is also known as a fourth fixed gearwheel. The fixed wheel sixth gear 32 is also known as a sixth fixed gearwheel. The idler first gear 60 is also known as a first gear idler gearwheel. The idler second gear 61 is also known as a second gear idler gearwheel. The idler third gear 62 is also known as a third gear idler gearwheel. The attached idler third gear 62' is also known as an attached third gear idler gearwheel. The idler fourth gear 63 is also known as a fourth gear idler gearwheel. The idler fifth gear 64 is also known as a fifth gear idler gearwheel. The idler sixth gear 65 is also known as a sixth gear idler gearwheel 65. The idler seventh gear 66 is also known as the seventh gear idler gearwheel. The coupling devices are also known as synchronizers.

The application provides the DCT 1 that permits gearshift operations with less loss of driving torque. This is because the gearshift operations can be achieved by selectively connecting one of the two clutches 8, 10 of the DCT 1. Therefore, an associated additional main drive clutch can be avoided. The selective connection between the two clutches also enables the realization of an automatic transmission that can be operated without interruptions in propulsive power. The propulsive power comprises momentum derived from the rotating gearwheels and shafts inside the DCT 1. Such a transmission is similar in design to a mechanical manual transmission and it has correspondingly very low friction losses. The DCT 1 further provides a parallel manual transmission that can be used for transverse installation in a front-wheel drive vehicle.

The DCT 1 according to the application can be connected similar to a known manual transmission, such as a parallel manual transmission. In a known manual transmission, a drive shaft for the front axle of a vehicle extends outward from its DCT case, and parallel to the output shaft 14 of the main DCT 1. The arrangement of the known manual transmission provides little space left for actuation of the manual transmission and clutch and for an optional electric motor. The optional electric motor can act as a starter device for a combustion engine, as an energy recuperation device for brake operation or as an additional drive means in hybrid vehicles. Having such little space presents a number of difficulties that are solved or are at least alleviated by the application. The application provides a DCT 1 that has two clutches for connecting to an electrical motor and the manual transmission in a compact manner.

The application provides a compact structure of a parallel transmission. The application provides the parallel transmission for a vehicle that includes two input shafts, each of which can be coupled non-rotatably via its own clutch to a shaft that is powered by a drive engine. The DCT 1 of the application further provides the output shaft 14 that is parallel to the input shafts 20, 22.

The DCT 1 according to the application is particularly well suited for transverse installation in front-wheel drive vehicles, in which the front differential, for example, is positioned below the pinions 41, 51, 55. A short overall length of the power train for transmitting torques can be achieved.

The application provides at least three relatively small pinions 41, 51, 55 on intermediately arranged layshafts 40, 50, 38, which combs with one relatively big output gearwheel 12 that in turn is connected with the output shaft 14. This arrangement provides a compact and lightweight DCT 1.

The application further allows a design in which the output gearwheel 12 is integrated into a transmission differential device without providing an intermediate output shaft of the DCT 1. This allows a very dense packaging situation for the DCT 1.

It is further advantageous to provide fixed wheels of the even gearwheels on one input shaft and fixed wheels of the odd gears on another input shaft. This arrangement provides the above-mentioned power-shift operation in a smooth and efficient manner when gearshift is performed sequentially. This is because the DCT can alternatively engage one of the two clutches 8, 10 to select gearwheels of the two input shafts. For example, the power-shift operation from the first gear to the fourth gear causes the hollow input shaft 22 and the solid input shaft 20 being engaged alternatively, which is energy efficient and fast.

The single double-meshing feature of the idler second gear 61 and the idler fourth gear 63 via the intermediate fixed wheel second gear 30, that is fixed wheel fourth gear 31, provides efficient gear shifts between the first gear and the fourth gear. No input shaft or clutch change is required for the direct gearshift between the second gear and the fourth gear. Since the fixed wheel second gear 30 is the same as the fixed wheel fourth gear 31, no additional gearwheel is required for providing each of the second gear and the fourth gear. Weight of the DCT 1 is reduced as comparing to having two separate gearwheels.

Gearwheels 60, 61, 62, 62' of the low gear, such as a first, second or third gear, are provided on the same upper layshaft 40, which is advantageous. This is because the upper layshaft 40 has lower rotational speed with larger size for higher torque, as compared to that of the lower layshaft 50. This arrangement eliminates the need of providing multiple layshafts with larger size for carrying those heavy-load gearwheels 60, 61, 62, 62' of the high gear ratios. The high gear ratio relates to low gears, such as the first, second, or the third gear. Therefore, the DCT 1 can be made light at less cost.

Layshaft bearing 73 on the upper layshaft 40 are mounted adjacent to gearwheels 60, 61 of low gear, such as first, second, or third gear, and the upper pinion 41. This arrangement provides stronger mechanical support to the upper layshaft 40 for less shaft deflection. Similarly, the layshaft bearing 73 and the idler shaft bearing 74 are provided next to the pinions 41, 51, 55 for stronger support. As a result, the layshafts 40, 50 and the reverse gear shafts 38, 39 can be reduced in weight for lower cost.

A variant of the embodiment with only one double-shared gearwheel on one of the input shafts 20, 22 has the advantage of providing a higher ratio-flexibility and less dependency. In the current example of DCT 1, changes between the second and four gears can be faster because both the idler second gear 61 and the idler fourth gear 63 are engaged with the fixed wheel second gear 30 all the time, thus readily available for the selection. It is beneficial to provide the gearwheels of the first gear, of the reverse gear, of the second gear and of the pinions close to the bearings for supporting. These gearwheels undergo bigger forces than those of the higher gears, such as the seventh gear, because the drive ratio is higher for the lower gears and reverse gears. Therefore, their shafts must take up higher driving forces. If those forces are taken up close to the support points of the shafts a reduced shaft bending will occur.

FIG. 2 illustrates the path of torque flow of a first gear transmission ratio. In FIG. 2, an input torque of the first gear is received from a crankshaft 2 of a combustion engine that is not shown. According to FIG. 2, the hollow input shaft 22 from the double-clutch 6 of the DCT 1 receives an input torque of the first gear. The torque of the first gear is transmitted from the hollow input shaft 22, via the fixed wheel third gear 25, and via the idler third gear 62. Then, the torque is transmitted via the first reverse gear wheel 35, via the reverse gear hollow shaft 39, via the pinion drive gear wheel 36, via the idler first gear 60, via the double-sided coupling device 80, via the upper layshaft 40, via the upper pinion 41, and via the output gearwheel 12 to the output shaft 14. The double-sided coupling device 80 is engaged to the idler first gear 60 when transmitting the torque of the first gear, which provides the first gear of the DCT 1. The number of tooth engagements or engaged gear pairs for the torque transfer of the first gear is four.

Figure 3:
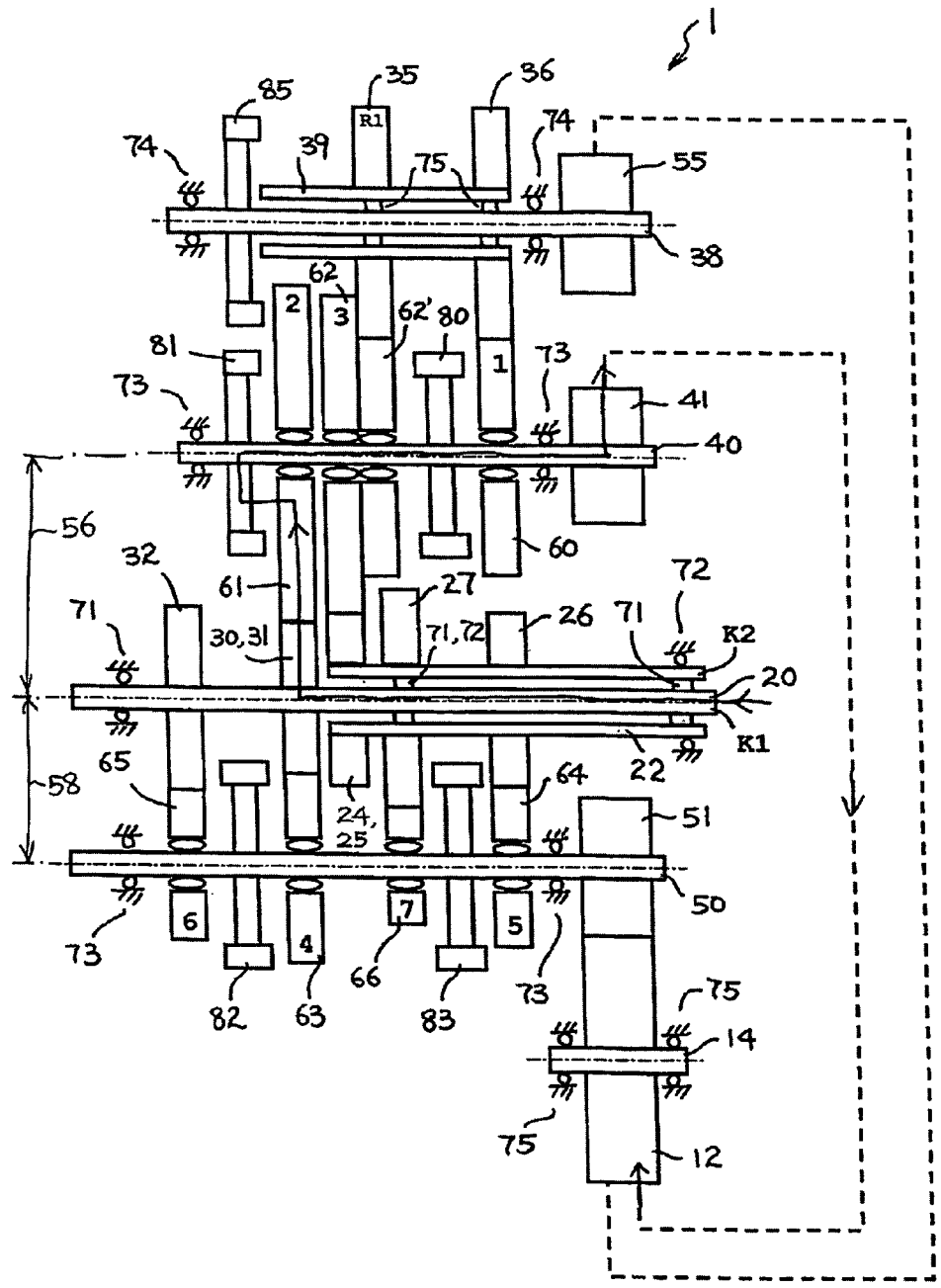
FIG. 3 illustrates the path of torque flow of a second gear transmission ratio.

FIG. 3 illustrates the path of torque flow of a second gear transmission ratio. In FIG. 3, an input torque of the second gear is received from the crankshaft 2 of the combustion engine that is not shown. According to FIG. 3, the solid input shaft 20 from the double-clutch 6 of the DCT 1 receives an input torque of the second gear. The torque of the second gear is transmitted from the solid input shaft 20, via the fixed wheel second gear 30, via the idler second gear 61, via the single-sided coupling device 81, via the upper layshaft 40, via the upper pinion 41, and via the output gearwheel 12 to the output shaft 14. The single-sided coupling device 81 is engaged to the idler second gear 61 when transmitting the torque of the second gear, which provides the second gear of the DCT 1. The number of tooth engagements or engaged gear pairs for the torque transfer of the second gear is two.

Figure 4:
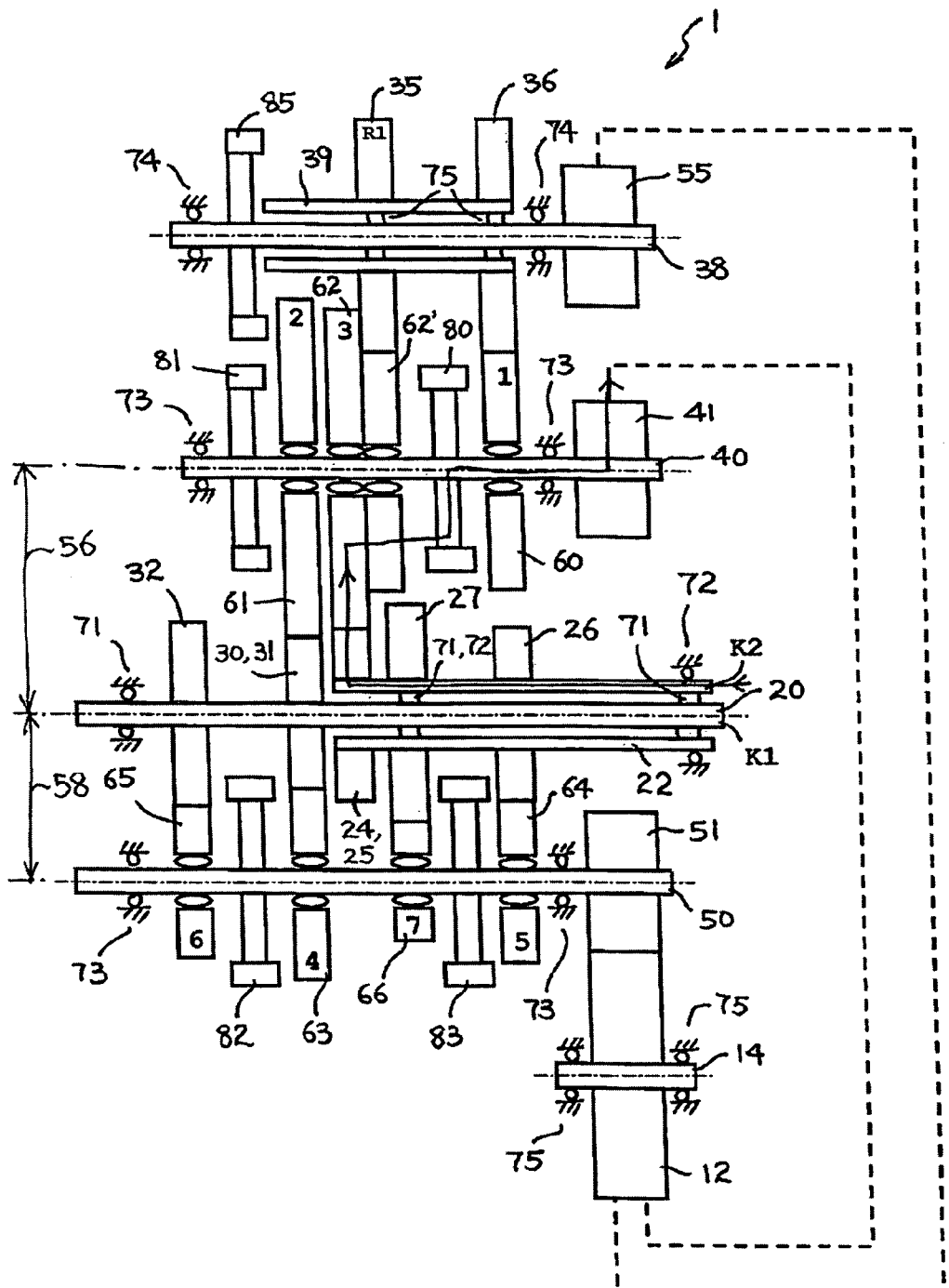
FIG. 4 illustrates the path of torque flow of a third gear transmission ratio.

FIG. 4 illustrates the path of torque flow of a third gear transmission ratio. In FIG. 4, an input torque of the third gear is received from the crankshaft 2 of the combustion engine that is not shown. According to FIG. 4, the hollow input shaft 22 from the two clutches of the DCT 1 receives an input torque of the third gear. The torque of the third gear is transmitted from the hollow input shaft 22, via the fixed wheel third gear 25, via the idler third gear 62, via the attached idler third gear 62', and via the double-sided coupling device 80. Later, the torque is sent via the upper layshaft 40, via the upper pinion 41, and via the output gearwheel 12 to the output shaft 14. The double-sided coupling device 80 is engaged to the attached idler third gear 62' when transmitting the torque of the third gear, which provides the third gear of the DCT 1. The number of tooth engagements or engaged gear pairs for the torque transfer of the third gear is two.

Figure 5:
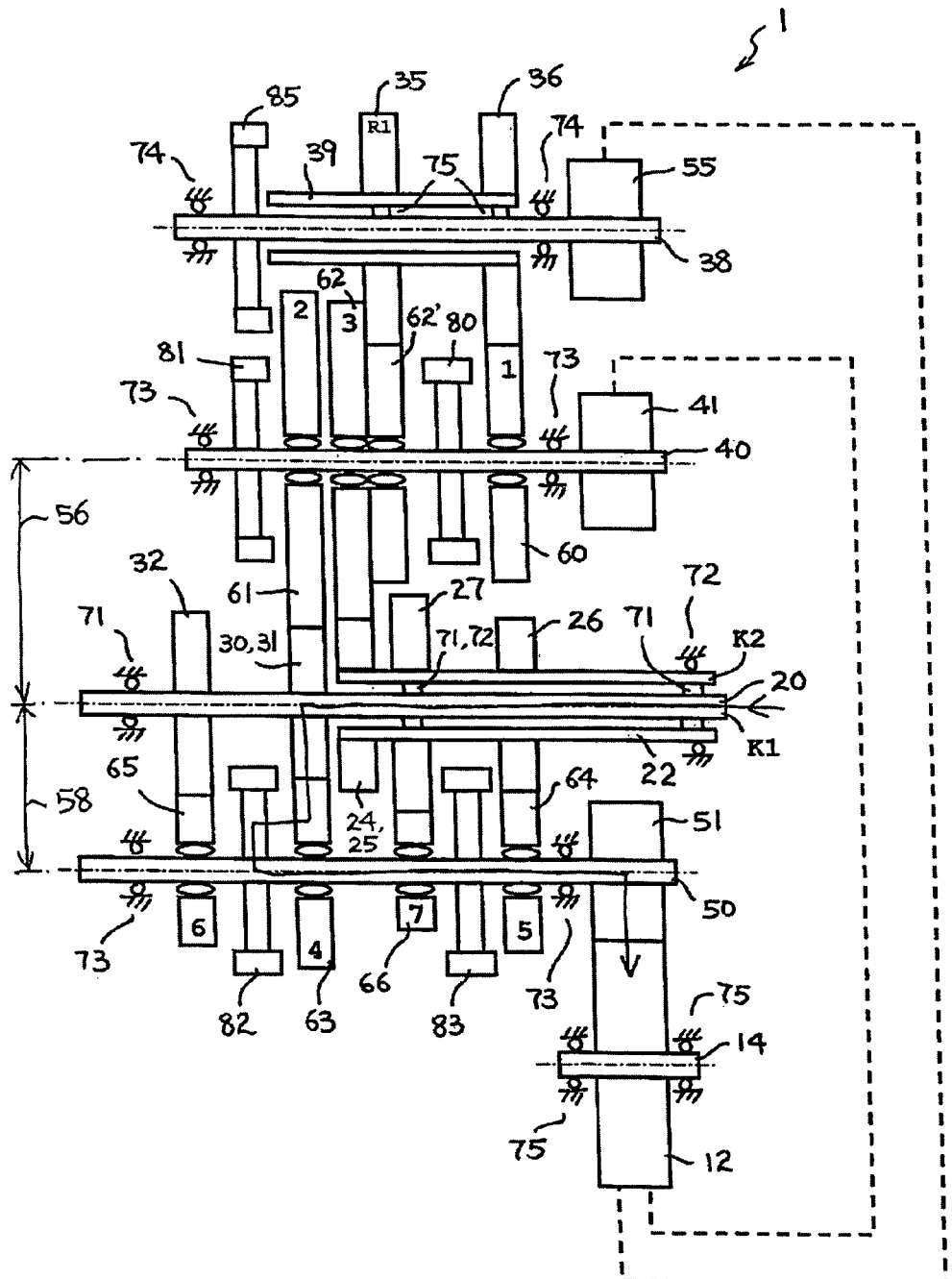
FIG. 5 illustrates the path of torque flow of a fourth gear transmission ratio.

FIG. 5 illustrates the path of torque flow of a fourth gear transmission ratio. In FIG. 5, an input torque of the fourth gear is received from the crankshaft 2 of the combustion engine that is not shown. According to FIG. 5, the solid input shaft 20 from the double-clutch 6 of the DCT 1 receives an input torque of the fourth gear. The torque of the fourth gear is transmitted from the solid input shaft 20, via the fixed wheel fourth gear 31, via the idler fourth gear 63, via the double-sided coupling device 82, via the lower layshaft 50, via the lower pinion 51, and via the output gearwheel 12 to the output shaft 14. The double-sided coupling device 82 is engaged to the idler fourth gear 63 when transmitting the torque of the fourth gear, which provides the fourth gear of the DCT 1. The number of tooth engagements or engaged gear pairs for the torque transfer of the fourth gear is two.

Figure 6:
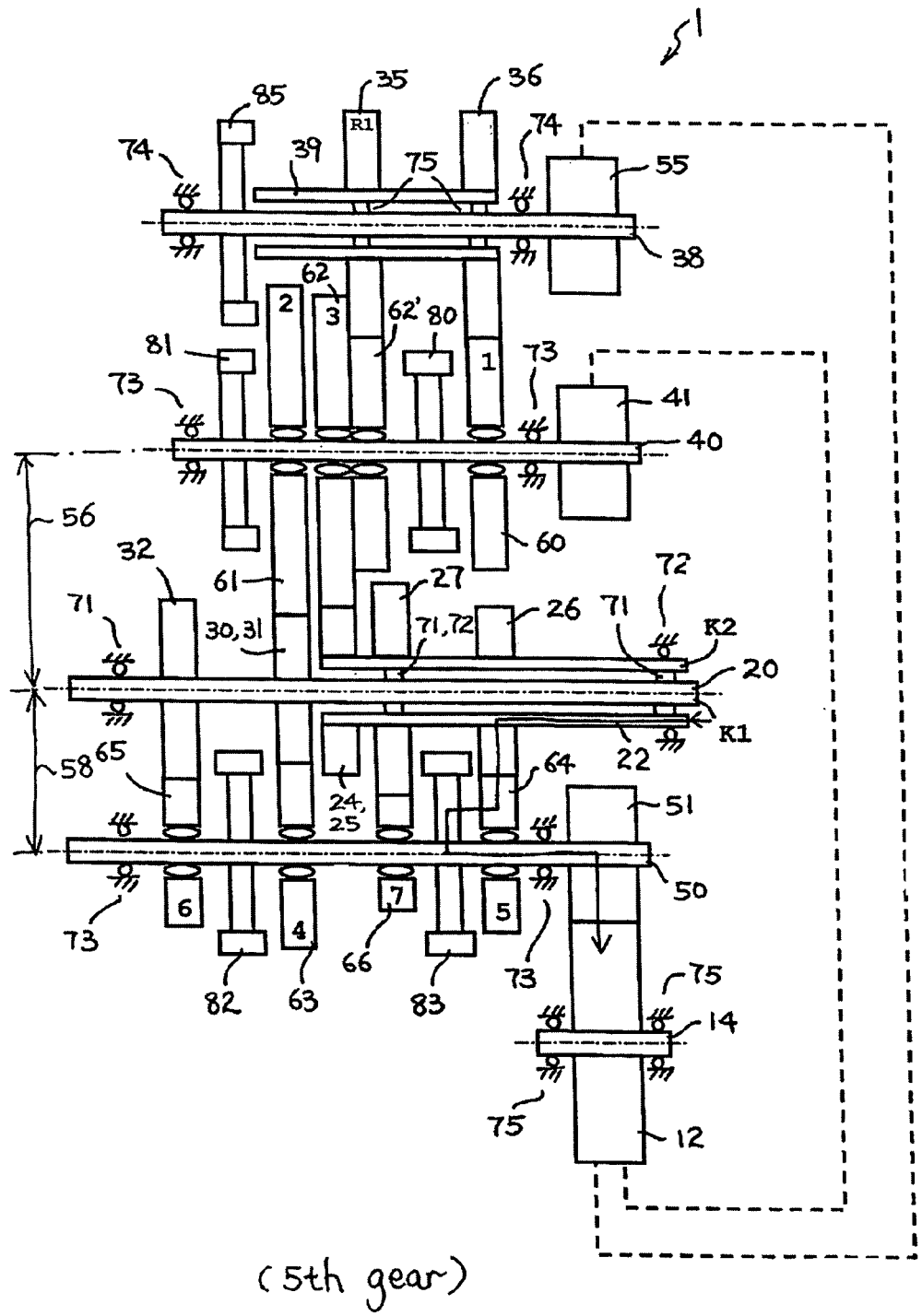
FIG. 6 illustrates the path of torque flow of a fifth gear transmission ratio.

FIG. 6 illustrates the path of torque flow of a fifth gear transmission ratio. In FIG. 6, an input torque of the fifth gear is received from the crankshaft 2 of a combustion engine that is not shown. According to FIG. 6, the hollow input shaft 22 from the double-clutch 6 of the DCT 1 receives an input torque of the fifth gear. The torque of the fifth gear is transmitted from the hollow input shaft 22, via the fixed wheel fifth gear 26, via the idler fifth gear 64, via the double-sided coupling device 83, via the lower layshaft 50, via the lower pinion 51, and via the output gearwheel 12 to the output shaft 14. The double-sided coupling device 83 is engaged to the idler fifth gear 64 when transmitting the torque of the fifth gear, which provides the fifth gear of the DCT 1. The number of tooth engagements or engaged gear pairs for the torque transfer of the fifth gear is two.

Figure 7:
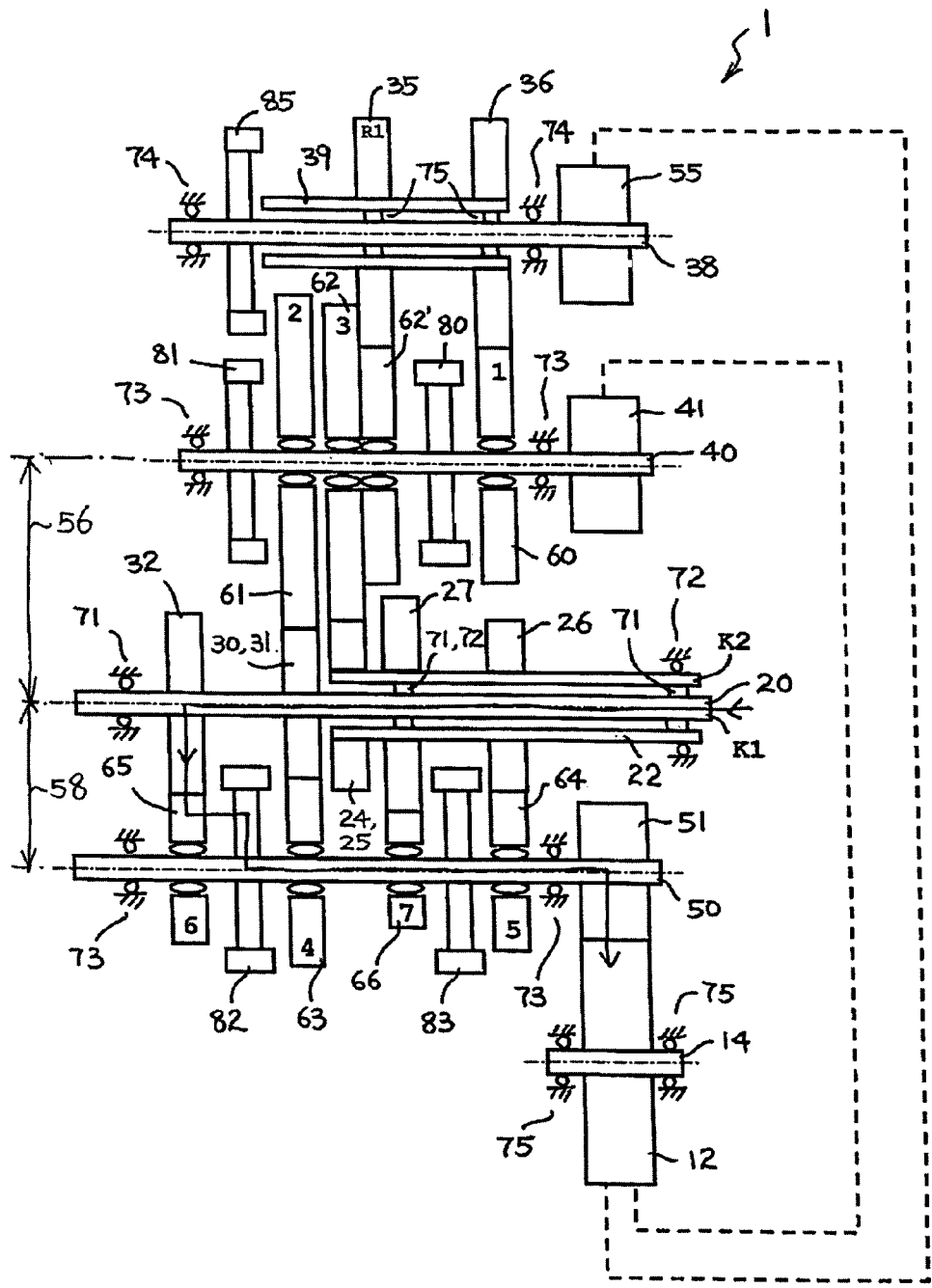
FIG. 7 illustrates the path of torque flow of a sixth gear transmission ratio.

FIG. 7 illustrates the path of torque flow of a sixth gear transmission ratio. In FIG. 7, an input torque of the sixth gear is received from the crankshaft 2 of a combustion engine that is not shown. According to FIG. 7, the solid input shaft 20 from the double-clutch 6 of the DCT 1 receives an input torque of the sixth gear. The torque of the sixth gear is transmitted from the solid input shaft 20, via the fixed wheel sixth gear 32, via the idler sixth gear 65, via the double-sided coupling device 82, via the lower layshaft 50, via the lower pinion 51, and via the output gearwheel 12 to the output shaft 14. The double-sided coupling device 82 is engaged to the idler sixth gear 65 when transmitting the torque of the sixth gear, which provides the sixth gear of the DCT 1. The number of tooth engagements or engaged gear pairs for the torque transfer of the sixth gear is two.

Figure 8:
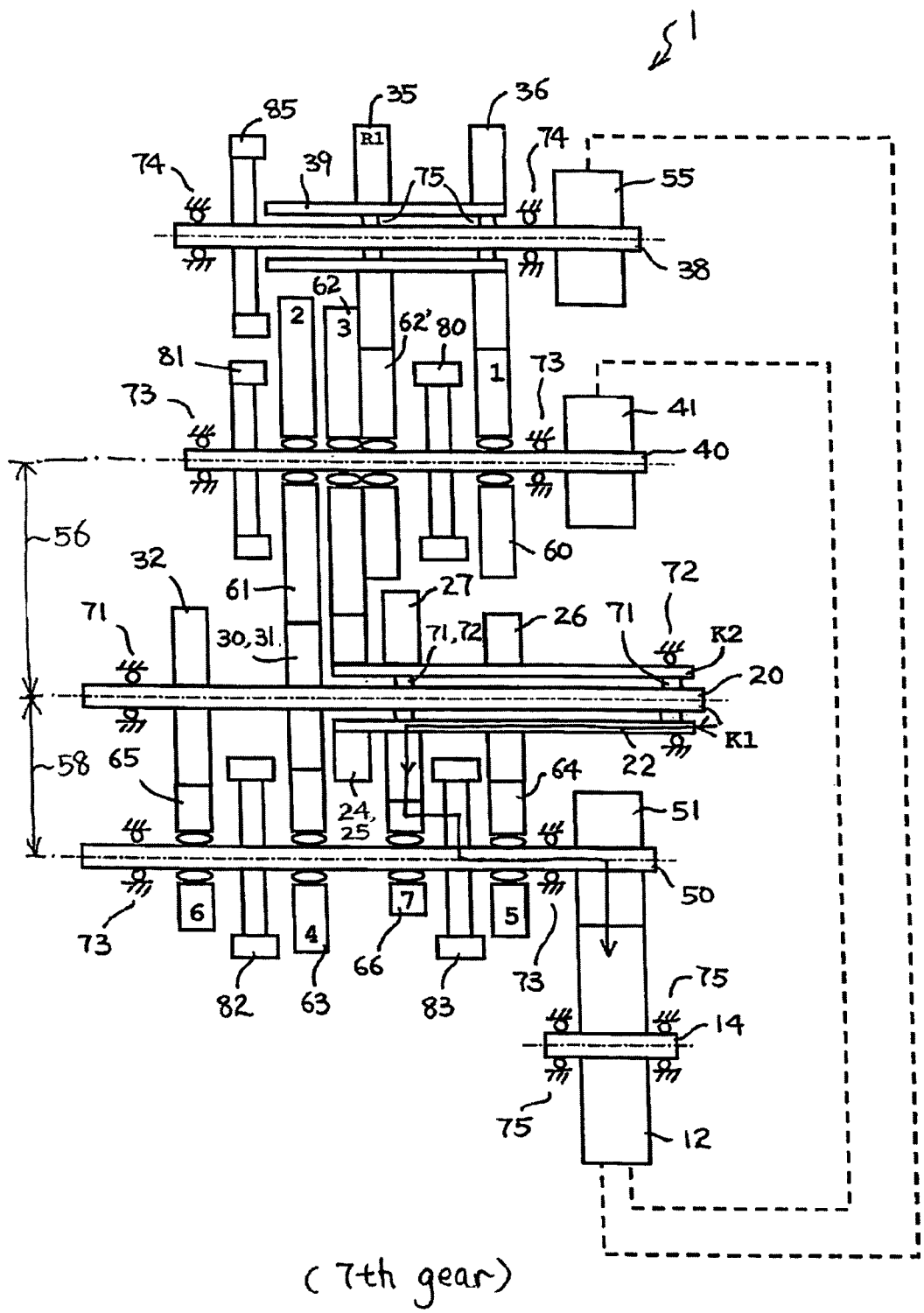
FIG. 8 illustrates the path of torque flow of a seventh gear transmission ratio.

FIG. 8 illustrates the path of torque flow of a seventh gear transmission ratio. In FIG. 8, an input torque of the seventh gear is received from the crankshaft 2 of a combustion engine that is not shown. According to FIG. 8, the hollow input shaft 22 from the double-clutch 6 of the DCT 1 receives an input torque of the seventh gear. The torque of the seventh gear is transmitted from the hollow input shaft 22, via the fixed wheel seventh gear 27, via the idler seventh gear 66, via the double-sided coupling device 83, via the lower layshaft 50, via the lower pinion 51, and via the output gearwheel 12 to the output shaft 14. The double-sided coupling device 83 is engaged to the idler seventh gear 66 when transmitting the torque of the seventh gear, which provides the seventh gear of the DCT 1. The number of tooth engagements or engaged gear pairs for the torque transfer of the seventh gear is two.

Figure 9:
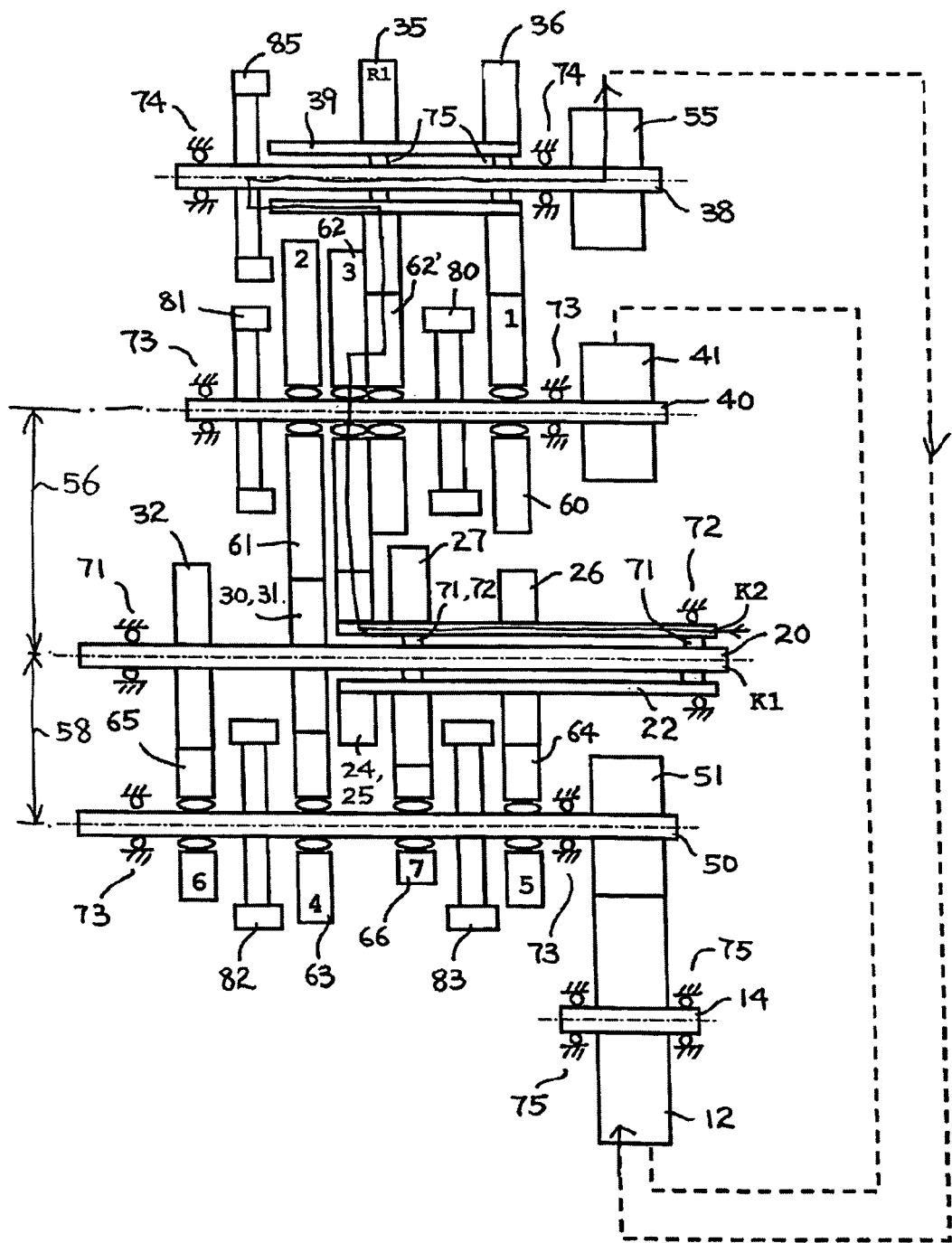
FIG. 9 illustrates the path of torque flow of a first reverse gear transmission ratio.

FIG. 9 illustrates the path of torque flow of a first reverse gear transmission ratio. In FIG. 9, an input torque of the reverse gear is received from the crankshaft 2 of a combustion engine that is not shown. According to FIG. 9, the hollow input shaft 22 from the double-clutch 6 of the DCT 1 receives an input torque of the reverse gear. The torque of the reverse gear is transmitted from the hollow input shaft 22, via the fixed wheel third gear 25, via the idler third gear 62, via the attached idler third gear 62', via the first reverse gear wheel 35, via the reverse gear hollow shaft 39, and via the single-sided coupling device 85. Afterward, the torque is sent via the reverse gear layshaft 38, via the reverse pinion 55, and via the output gearwheel 12 to the output shaft 14. The single-sided coupling device 85 is engaged to the reverse gear hollow shaft 39 when transmitting the torque of the reverse gear, which provides the reverse gear of the DCT 1. The number of tooth engagements or engaged gear pairs for the torque transfer of the reverse gear is three.

Alternative paths for transmitting some of the above-mentioned torque flow paths of the DCT 1 can also be provided.

Figure 10:
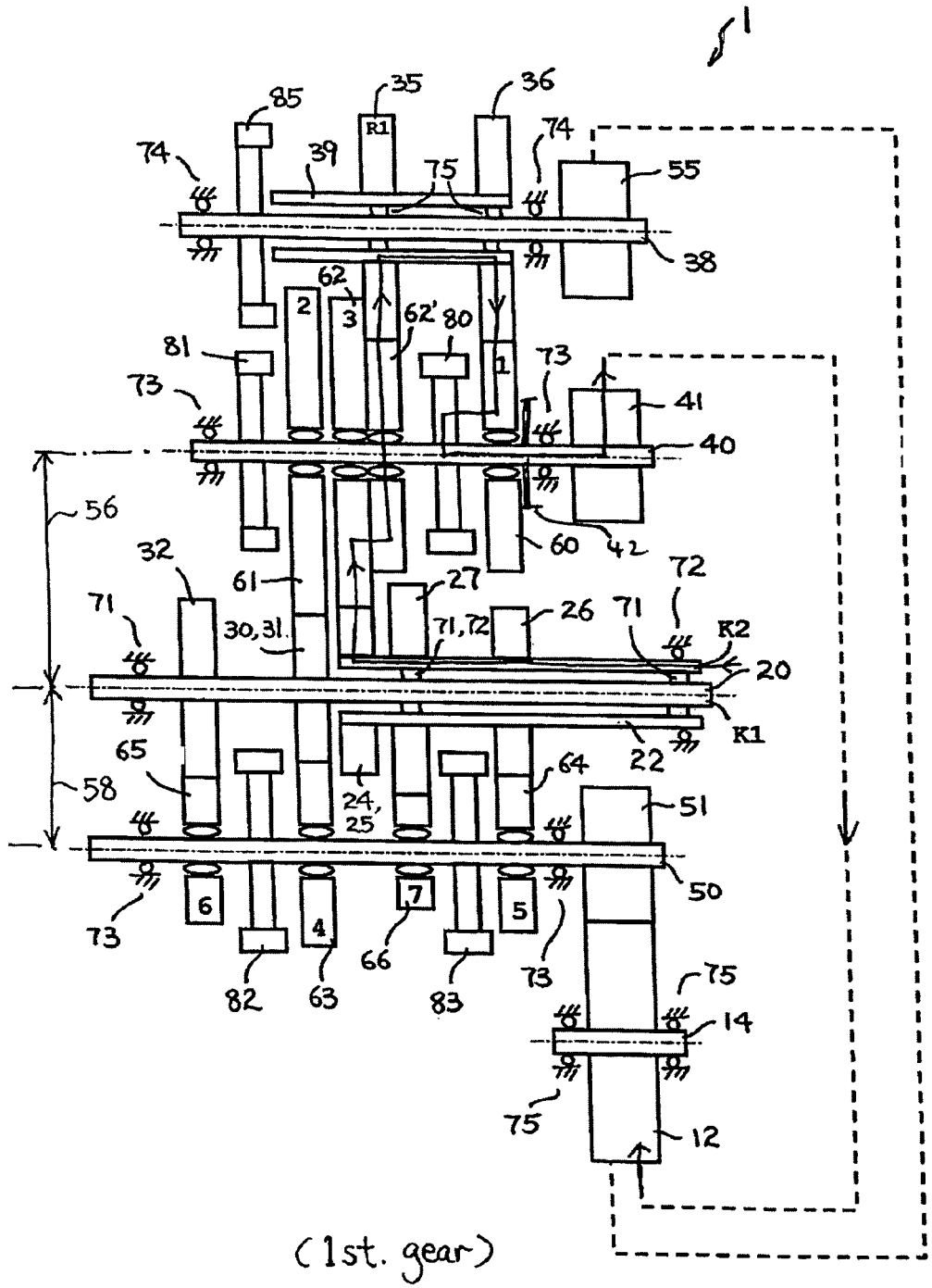
FIG. 10 illustrates a further embodiment of FIG. 2 that comprises a park-lock.

FIG. 10 shows a further embodiment of FIG. 2. FIG. 10 includes all parts of the FIG. 2. The parts include the upper layshaft 40. A plurality of parts are mounted the upper layshaft 40. The parts includes, from right to the left, a park-lock wheel 42, the upper pinion 41, an idler first gear 60, a double-sided coupling device 80, an attached idler third gear 62', an idler third gear 62, an idler second gear 61 and a single-sided coupling device 81.

A park lock comprises the park-lock wheel 42 that includes a wheel. The wheel is provided with a ratchet device or with a click device to lock the upper layshaft 40. The click device has a rack element, a claw or similar. In a park mode, the park-lock 42 is engaged to lock the output shaft 14, via the upper layshaft 40, and via the upper pinion 41, thus stopping the output shaft 14 from rotating.

A gearshift lever that is located in a driving compartment and that is movable by a vehicle operator between positions corresponding to transmission gear ranges, such as park, reverse, neutral, drive, and low controls the DCT 1 with the park-lock. A linear actuation cable is attached at its first end to the gearshift lever. Movement of the gearshift lever alternatively pushes or pulls on the cable to move a transmission mode select lever attached to the other end of the cable. The mode select lever is connected mechanically to a shift valve within a DCT housing, and movement of the shift valve effects shifting between different gears.

When the gearshift lever is placed in the park position, two related mechanical actuations take place within the DCT 1. First, the mode select lever is moved, depending on design of the clutch system, to disengage or to engage the input shafts 20, 22 from an engine. Second, the park-lock pawl is moved into locking engagement with the park-lock wheel 42 to thereby lock the output shaft 14 against rotation.

Figure 11:
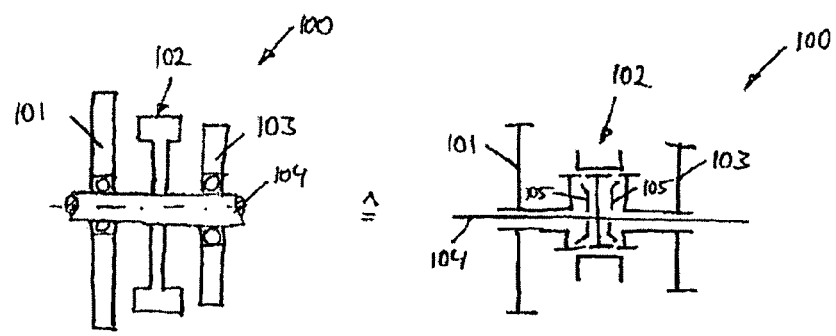
FIG. 11 illustrates an assembly of a double-sided coupling device for engaging with its neighboring gearwheels.

FIG. 11 illustrates an assembly 100 of a double-sided coupling device 102 with its neighboring gearwheels 101, 103 for engagement. The assembly 100 comprises a shaft 104 with the two coaxially mounted idler gears 101, 103 on two bearings respectively. The coupling device 102 is provided between the idler gear 101 on the left and the idler gear 103 on the right. The coupling device 102 is configured to move along the shaft 104 to selectively engage any of the idler gears 101, 103 at one time. In other words, the idler gears 101, 103 can alternatively be brought into non-rotating engagement with the shaft 104 by the coupling device 102. Symbols for showing the assembly 100 is provided at the right hand side of FIG. 11.

Figure 12:
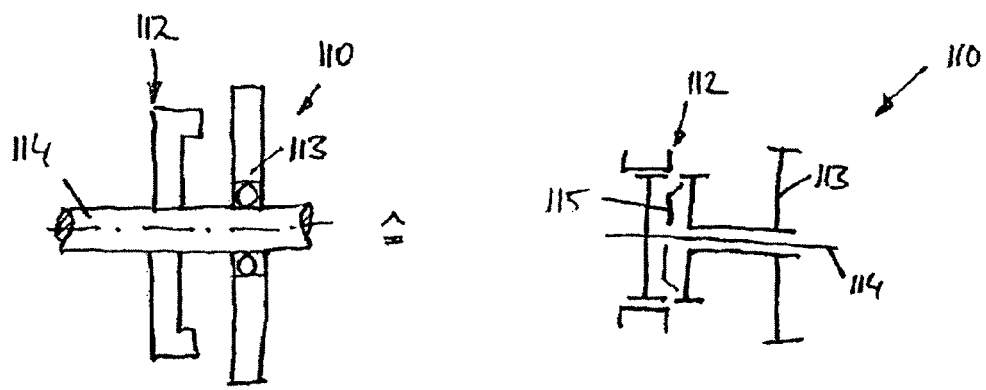
FIG. 12 illustrates an assembly of a single-sided coupling device for engaging with its neighboring gearwheel.

FIG. 12 illustrates an assembly 110 of a single-sided coupling device 112 with its neighboring gearwheel 113 for engagement. The assembly 110 comprises a shaft 114 with the one coaxially mounted idler gear 113 on a bearing. The coupling device 112 is provided next to the idler gear 113 on the left side. The coupling device 112 is configured to move along the shaft 114 to engage or disengage the idler gears 113. In other words, the idler gear 113 can be brought into non-rotating engagement with the shaft 114 by the single-sided coupling device 112. Symbols for showing the assembly 110 are provided at the right hand side of FIG. 12. In practice two single-sided couple device can replace one double-sided coupling device.

Figure 13:
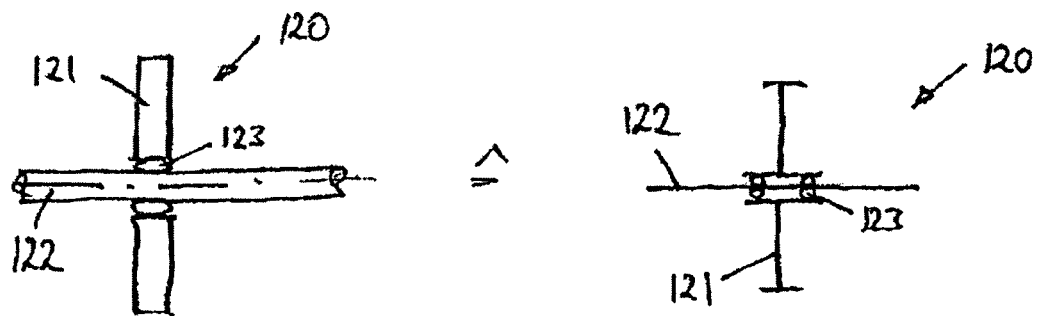
FIG. 13 illustrates an assembly of an idler gearwheel that is supported rotatably on a bearing by a shaft.

FIG. 13 illustrates an assembly 120 of an idler gearwheel 121 that is supported rotatably by a shaft 122 on a bearing 123. The idler gearwheel 121 is mounted coaxially onto the shaft 122 via the bearing 123. The bearing 123 enables the idler gearwheel 121 to be rotated freely around the shaft 122. Symbols that represent the assembly 120 are provided at the right hand side of the FIG. 13.

Figure 14:
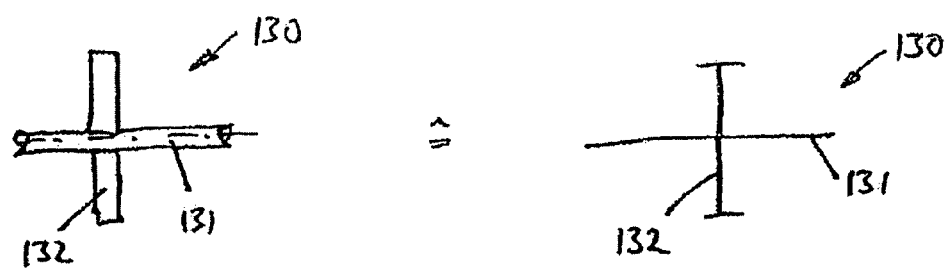
FIG. 14 illustrates an assembly of a fixed gearwheel that is supported on a shaft.

FIG. 14 illustrates an assembly 130 of a fixed gearwheel 132 that is supported on a shaft 131. The fixed gearwheel 132 is mounted coaxially onto the shaft 131 such that the gearwheel 132 is fixed to the shaft 132. The fixed gearwheel 132 and the shaft 131 are joined as one single body such that torque of the fixed gearwheel 132 is transmitted to the shaft 131 directly, and vice versa.

A number of fixed gearwheels are connected rigidly to the input shafts 20, 22 and other shafts 14, 38, 40, 50. A symbol as used in the previous figures for such a fixed gearwheel is provided on the left side in FIG. 14. The more commonly used symbol for such a fixed gearwheel is provided on the right side in FIG. 14.

Figure 15:
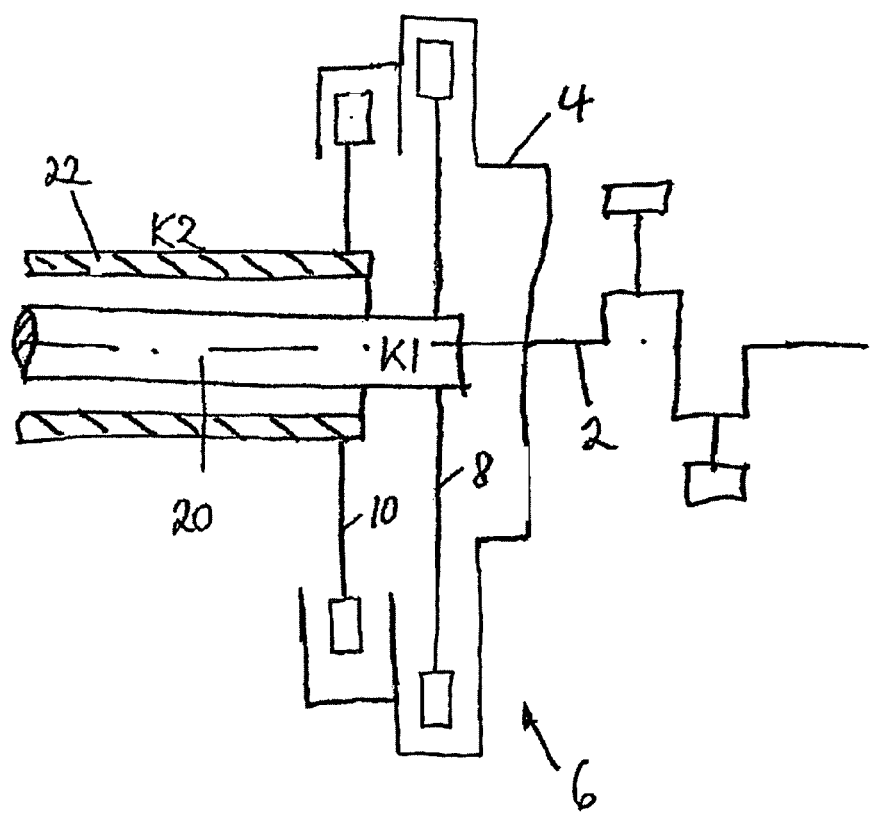
FIG. 15 illustrates a cross-section through a crankshaft of an internal combustion engine according to embodiment of the DCT.

FIG. 15 illustrates a cross-section through a crankshaft 2 of an internal combustion engine according to the embodiment of the DCT 1. The combustion engine is not shown in FIG. 15. According to FIG. 15, a crankshaft 2 of an internal combustion engine is non-rotatably connected to the housing 4 of a double-clutch 6. The double-clutch 6 includes an inner clutch disc 8 and an outer clutch disc 10, which can be brought into non-rotating engagement with the housing 4 via control elements that are not illustrated here. The solid input shaft 20 is non-rotatably connected to the disc of the clutch 8, and extends all the way through the hollow shaft 22. Similarly, the hollow input shaft 22 is non-rotatably connected to the other clutch disc 10.

An outer diameter around the inner clutch disc 8 is larger than an outer diameter around the outer clutch disc 10. Correspondingly, an outer diameter of the inner clutch disc 8 is larger than an outer diameter of the outer clutch disc 10.

One double meshing feature is provided by the second fixed gearwheel that meshes with the second gear idler gearwheel and with the fourth gear idler gearwheel.

The above-mentioned torque flow paths not only provide viable solutions to generate multiple gears of the DCT 1, but also offer possibilities of switching from one gear to the other efficiently. For example, gear change from second gear to the fourth gear is possible. This is efficiently provided by the double-meshing of the idler second gear 61 and the idler fourth gear 63, via an intermediate gearwheel, namely the fixed wheel second gear 30. The gear jumps or changes from the second gear to the fourth gear do not require stopping a rotation of the solid input shaft 20. Furthermore, the double meshing of the idler second gear 61 and the idler fourth gear 63 avoids the need of providing two separate fixed gearwheels on an input shaft. In other words, less space is required on the solid input shaft 20 because two fixed gearwheels 30, 31 are combined into a single one. The DCT 1 can thus be made lighter and cheaper by the reduction of one gearwheel.

When using the park-lock, the pinion drive gear wheel 36 on the reverse gear layshaft 38 can be easily engaged to lock the output shaft 14, via the reverse gear hollow shaft 39, via the single-sided coupling device 85, via the reverse gear layshaft 38, via the reverse pinion 55 and via the output gearwheel 12.

In providing gear meshing or combing for torque transmission, less number of gear tooth engagement, that is gear engagement, is preferred. The less number of gear tooth engagement provides lower noise and more efficient torque transmission. Examples of the less number of gear tooth engagement are found in some of the above-mentioned torque flow paths.

The DCT 1 drives the gearwheel groups of the second gear and of the reverse gear by different input shafts 20, 22. This provides the ability to drive a vehicle with the DCT 1 changing between a slow forward and a slow backward without engaging and disengaging the same gearwheels. Just by engaging and disengaging the respective clutches 8, 10 of the two input shafts 20, 22, the DCT 1 enables the vehicle to move back and forth quickly with little loss of the transmission power or gearwheels momentum. This helps in many situations in which a wheel of a vehicle is stuck in a hostile environment such as a snow hole or a mud hole. The stuck vehicle can then be swayed free just by switching engagement between the two clutches 8, 10 of the DCT 1.

Although the above description contains much specificity, these should not be construed as limiting the scope of the embodiments but merely providing illustration of the foreseeable embodiments. Especially the above stated advantages of the embodiments should not be construed as limiting the scope of the embodiments but merely to explain possible achievements if the described embodiments are put into practice. Thus, the scope of the embodiments should be determined by the claims, rather than by the examples given.

What is claimed is:

1. A double-clutch transmission, comprising:
    an inner input shaft;
    an outer input shaft enclosing at least a portion of the inner input shaft;
    a first clutch disc connected to the inner input shaft;
    a second clutch disc connected to the outer input shaft,
    a first layshaft, a second layshaft, and a third layshaft spaced apart from the inner input shaft and arranged in parallel to the inner input shaft and the outer input shaft;
    at least one of the first layshaft, the second layshaft, or the third layshaft comprising a pinion for outputting a drive torque;
    gearwheels arranged on the first layshaft, on the second layshaft, on the third layshaft, on the inner input shaft and on the outer input shaft, the gearwheels comprising a first gearwheel group, a second gearwheel group, a third gearwheel group, a fourth gearwheel group, a fifth gearwheel group, a sixth gearwheel group, a seventh gearwheel group and reverse gearwheel group adapted to provide seven sequentially increasing forward gears and one reverse gear;
    wherein the first gearwheel group comprising a first fixed gearwheel on the outer input shaft, meshing with a first gear idler gearwheel on one of the first layshaft, the second layshaft, or the third layshaft,
    wherein the third gearwheel group comprising a third fixed gearwheel on the outer input shaft, meshing with a third gear idler gearwheel on one of the first layshaft, the second layshaft, or the third layshaft,
    wherein the fifth gearwheel group comprising a fifth fixed gearwheel on the outer input shaft, meshing with a fifth gear idler gearwheel on one of the first layshaft, the second layshaft, or the third layshaft,
    wherein the seventh gearwheel group comprising a seventh fixed gearwheel on the outer input shaft, meshing with a seventh gear idler gearwheel on one of the first layshaft, the second layshaft, or the third layshaft,
    wherein the second gearwheel group comprising a second fixed gearwheel on the inner input shaft, meshing with a second gear idler gearwheel on one of the first layshaft, the second layshaft, or the third layshaft,
    wherein the fourth gearwheel group comprising a fourth fixed gearwheel on the inner input shaft, meshing with a fourth gear idler gearwheel on one of the first layshaft, the second layshaft, or the third layshaft,
    wherein the sixth gearwheel group comprising a sixth fixed gearwheel on the inner input shaft, meshing with a sixth gear idler gearwheel on one of the first layshaft, the second layshaft, or the third layshaft,
    wherein the reverse gearwheel group comprising a fixed driving gearwheel on one of the inner input shaft, meshing with a reverse gear idler gearwheel on one of the first layshaft, the second layshaft, or the third layshaft,
    wherein each gearwheel group comprising a coupling device which is arranged on one of the first layshaft, the second layshaft, or the third layshaft to selectively engage one of an idler gearwheels for providing one of a plurality of gears,
    wherein the second fixed gearwheel meshes with the second gear idler gearwheel and the fourth gear idler gearwheel,
    wherein the double-clutch transmission further comprises a park-lock that is provided on one of the first layshaft, the second layshaft, or the third layshaft.

2. The double-clutch transmission according to claim 1, wherein a first forward gear is provided to the inner input shaft and a reverse gear is provided the outer input shaft.

3. The double-clutch transmission according to claim 1, wherein
    the park-lock is provided on the first layshaft, the second layshaft, or the third layshaft that comprises the pinion.

4. The double-clutch transmission according to claim 1, wherein two gearwheels on the third layshaft mesh with two other gearwheels on the first layshaft.

5. The double-clutch transmission according to claim 1, wherein a first distance between the first layshaft and the inner input shaft is greater than a second distance between the second layshaft and the inner input shaft.

6. The double-clutch transmission according to claim 1, wherein at least two of the fourth gear idler gearwheel, the fifth gear idler gearwheel , the sixth gear idler gearwheel and the seventh gear idler gearwheel are mounted on the same one of the first layshaft, the second layshaft, or the third layshaft.

7. The double-clutch transmission according to claim 1, wherein at least two of the first gear idler gearwheel, the second gear idler gearwheel and the third gear idler gearwheel are mounted on the same one of the first layshaft, the second layshaft, or the third layshaft.

8. The double-clutch transmission of claim 7, wherein the first gear idler gearwheel, the second gear idler gearwheel and the third gear idler gearwheel are mounted on the first layshaft.

9. The double-clutch transmission according to claim 1, further comprising bearings for supporting the first layshaft, the second layshaft, or the third layshaft, at least one of the bearings being provided adjacent one of the first gear idler gearwheel , the third gear idler gearwheel, and the second gear idler gearwheel.

10. A gearbox, comprising:
    a double-clutch transmission, comprising:
    an inner input shaft;
    an outer input shaft enclosing at least a portion of the inner input shaft;
    a first clutch disc connected to the inner input shaft;
    a second clutch disc connected to the outer input shaft,
    a first layshaft, a second layshaft, and a third layshaft spaced apart from the inner input shaft and arranged in parallel to the inner input shaft and the outer input shaft;
    at least one of the first layshaft, the second layshaft, or a third layshaft comprising a pinion for outputting a drive torque;
    gearwheels arranged on the first layshaft, on the second layshaft, on the third layshaft, on the inner input shaft and on the outer input shaft, the gearwheels comprising a first gearwheel group, a second gearwheel group, a third gearwheel group, a fourth gearwheel group, a fifth gearwheel group, a sixth gearwheel group, a seventh gearwheel group and reverse gearwheel group adapted to provide seven sequentially increasing forward gears and one reverse gear;

wherein the first gearwheel group comprising a first fixed gearwheel on the outer input shaft, meshing with a first gear idler gearwheel on one of the first layshaft, the second layshaft, or the third layshaft, wherein the third gearwheel group comprising a third fixed gearwheel on the outer input shaft, meshing with a third gear idler gearwheel on one of the first layshaft, the second layshaft, or the third layshaft, wherein the fifth gearwheel group comprising a fifth fixed gearwheel on the outer input shaft, meshing with a fifth gear idler gearwheel on one of the first layshaft, the second layshaft, or the third layshaft, wherein the seventh gearwheel group comprising a seventh fixed gearwheel on the outer input shaft, meshing with a seventh gear idler gearwheel on one of the first layshaft, the second layshaft, or the third layshaft, wherein the second gearwheel group comprising a second fixed gearwheel on the inner input shaft, meshing with a second gear idler gearwheel on one of the first layshaft, the second layshaft, or the third layshaft, wherein the fourth gearwheel group comprising a fourth fixed gearwheel on the inner input shaft, meshing with a fourth gear idler gearwheel on one of the first layshaft, the second layshaft, or the third layshaft, wherein the sixth gearwheel group comprising a sixth fixed gearwheel on the inner input shaft, meshing with a sixth gear idler gearwheel on one of the first layshaft, the second layshaft, or the third layshaft, wherein the reverse gearwheel group comprising a fixed driving gearwheel on one of the inner input shaft, meshing with a reverse gear idler gearwheel on one of the first layshaft, the second layshaft, or the third layshaft, wherein each gearwheel group comprising a coupling device which is arranged on one of the first layshaft, the second layshaft, or the third layshaft to selectively engage one of an idler gearwheels for providing one of a plurality of gears, wherein the second fixed gearwheel meshes with the second gear idler gearwheel and the fourth gear idler gearwheel, wherein the double-clutch transmission further comprises a park-lock that is provided on one of the first layshaft, the second layshaft, or the third layshaft;

an output gearwheel that meshes with an upper pinion on the first layshaft;

a lower pinion on the second layshaft; and a reverse pinion on the third layshaft for outputting torques of the first layshaft, the second layshaft, or the third layshaft.

11. A power train device, comprising:
a double-clutch transmission, comprising:
an inner input shaft;
an outer input shaft enclosing at least a portion of the inner input shaft;
a first clutch disc connected to the inner input shaft;
a second clutch disc connected to the outer input shaft,
a first layshaft, a second layshaft, and a third layshaft spaced apart from the inner input shaft and arranged in parallel to the inner input shaft and the outer input shaft;
at least one of the first layshaft, the second layshaft, or the third layshaft comprising a pinion for outputting a drive torque;

gearwheels arranged on the first layshaft, on the second layshaft, on the third layshaft, on the inner input shaft and on the outer input shaft, the gearwheels comprising a first gearwheel group, a second gearwheel group, a third gearwheel group, a fourth gearwheel group, a fifth gearwheel group, a sixth gearwheel group, a seventh gearwheel group and reverse gearwheel group adapted to provide seven sequentially increasing forward gears and one reverse gear;

wherein the first gearwheel group comprising a first fixed gearwheel on the outer input shaft, meshing with a first gear idler gearwheel on one of the first layshaft, the second layshaft, or the third layshaft, wherein the third gearwheel group comprising a third fixed gearwheel on the outer input shaft, meshing with a third gear idler gearwheel on one of the first layshaft, the second layshaft, or the third layshaft, wherein the fifth gearwheel group comprising a fifth fixed gearwheel on the outer input shaft, meshing with a fifth gear idler gearwheel on one of the first layshaft, the second layshaft, or the third layshaft, wherein the seventh gearwheel group comprising a seventh fixed gearwheel on the outer input shaft, meshing with a seventh gear idler gearwheel on one of the first layshaft, the second layshaft, or the third layshaft, wherein the second gearwheel group comprising a second fixed gearwheel on the inner input shaft, meshing with a second gear idler gearwheel on one of the first layshaft, the second layshaft, or the third layshaft, wherein the fourth gearwheel group comprising a fourth fixed gearwheel on the inner input shaft, meshing with a fourth gear idler gearwheel on one of the first layshaft, the second layshaft, or the third layshaft, wherein the sixth gearwheel group comprising a sixth fixed gearwheel on the inner input shaft, meshing with a sixth gear idler gearwheel on one of the first layshaft, the second layshaft, or the third layshaft, wherein the reverse gearwheel group comprising a fixed driving gearwheel on one of the inner input shaft, meshing with a reverse gear idler gearwheel on one of the first layshaft, the second layshaft, or the third layshaft, wherein each gearwheel group comprising a coupling device which is arranged on one of the first layshaft, the second layshaft, or the third layshaft to selectively engage one of an idler gearwheels for providing one of a plurality of gears, wherein the second fixed gearwheel meshes with the second gear idler gearwheel and the fourth gear idler gearwheel, wherein the double-clutch transmission further comprises a park-lock that is provided on one of the first layshaft, the second layshaft, or the third layshaft;

an output gearwheel (12) that meshes with an upper pinion (41) on the first layshaft (40);

a lower pinion (51) on the second layshaft (50); and a reverse pinion (55) on the third layshaft (38) for outputting torques of the first layshaft, the second layshaft, or the third layshaft; and at least one power source for generating a driving torque.

12. The Power train device of claim 11, wherein the at least one power source comprises a combustion engine.

13. The power train device of claim 12, wherein the at least one power source comprises an electric motor.

* * * * *